United States Patent [19]

Kakinami et al.

[11] Patent Number: 4,931,937
[45] Date of Patent: Jun. 5, 1990

[54] DISTANCE DETECTOR MOUNTED ON VEHICLE

[75] Inventors: Toshiaki Kakinami, Kawasaki; Shigemitsu Hamajima, Obu, both of Japan

[73] Assignee: Aisin Seiki Kabushiki Kaisha, Aichi, Japan

[21] Appl. No.: 239,254

[22] Filed: Sep. 1, 1988

[30] Foreign Application Priority Data

Sep. 1, 1987 [JP] Japan .................................. 62-218935

[51] Int. Cl.⁵ .................................................. G06F 15/50
[52] U.S. Cl. ................................. 364/424.01; 382/22; 340/937; 180/169; 364/460
[58] Field of Search ............... 364/426.04, 424.02, 364/424.01, 443, 449, 456, 513, 458; 340/933, 937; 356/3; 382/22, 23, 25; 180/169

[56] References Cited

U.S. PATENT DOCUMENTS

| | | | |
|---|---|---|---|
| 4,630,109 | 12/1986 | Barton | 358/103 |
| 4,709,264 | 11/1987 | Tamura et al. | 358/93 |
| 4,712,248 | 12/1987 | Hongo | 382/22 |
| 4,757,450 | 12/1988 | Etoh | 364/426.04 |
| 4,783,833 | 11/1988 | Kawabata et al. | 382/22 |
| 4,805,018 | 2/1989 | Nishimura et al. | 358/105 |
| 4,817,166 | 3/1989 | Gonzalez et al. | 382/1 |

Primary Examiner—Thomas G. Black
Attorney, Agent, or Firm—Sughrue, Mion, Zinn, Macpeak & Seas

[57] ABSTRACT

A distance detection device mounted on a vehicle and the driver of the vehicle can recognize an obstacle in front of him through the device on the road on which he is driving. The device is electronic with a TV camera, memory and CRT. Those units enable the drive not only to recognize an obstacle on the road, but also to know the distance from his vehicle to an obstacle in front of him such as another vehicle.

5 Claims, 27 Drawing Sheets

| (x−1, y−1) D(4) | (x, y−1) D(3) | (x+1, y−1) D(2) |
|---|---|---|
| (x−1, y) D(5) | (x, y) | (x+1, y) D(1) |
| (x−1, y+1) D(6) | (x, y+1) D(7) | (x+1, y+1) D(8) |

W2

W2

DISTANCE DETECTOR MOUNTED ON VEHICLE

FIELD OF THE INVENTION

This invention relates to a distance detector mounted on a vehicle to detect an obstacle in a prescribed direction and to detect the distance to the obstacle, and more particularly, to a distance detector mounted on a vehicle to detect the distance from the vehicle to a vehicle running in front of it.

BACKGROUND OF THE INVENTION

In the known art in this field, various devices utilizing microwave, ultrasonic wave, etc. for detecting the distance between vehicles are known. Those devices have a problem in that when two vehicles which have a device of the same kind mounted on them, the devices develop interference between them so that their use is limited to the detection of a very short distance between vehicles.

In Japanese Patent Laid Open No. 197816-1984, a device is disclosed which has in memory, data representing characteristic features of various vehicles, and two TV cameras for two sets of image signals in front of the vehicle, processes the two sets of image signals by feature parameters, detects the vehicle in front of the vehicle by comparing the processed data with the feature data in the memory, and then detects the distance between two vehicles by conducting a triangular survey from the spatial discrepancies in the processed data of the detected vehicle in front.

With this device there is no interference between two similar detectors when they come close together because they do not use microwave, ultrasonic wave, etc.

Because this device uses feature data of vehicles for detecting the front vehicle, it is required that feature data on all of the present running vehicles be stored in the memory, and therefore every time a new vehicle is put on the market its feature data must be newly registered or updated in the device. It is, therefore, necessary for the device to possess a memory having a vast capacity, and its contents must be renewed from time to time. This is a disadvantage, and the principle on which the device is made can not be said to be practical. Furthermore, for retrieving a feature data stored in the memory, a large amount of data processing is required and the time spent for the processing is too large, which are also disadvantages of this device.

SUMMARY OF THE INVENTION

It is, therefore, an object of the present invention to provide a distance detector mounted on a vehicle which accurately detects the distance of an object for detection without requiring the feature data on the object to be detected.

In order to achieve the above-mentioned object, the present invention provides a distance detection device which comprises original image information generating means which generates original image information corresponding to at least part of a scene in a set detection direction, supervision area setting means to set a supervision area which specifies at least part of the original image information, first feature extraction area setting means which successively renews to set the search area, at least part of which is included in said supervision area, and which sets a first feature extraction area based on the search area when the correlation of optical feature components of an original image information in the search area and an occupation area satisfies set conditions, first edge extraction means Which extracts an edge in an area in which the optical feature components of the original image information in the first feature extraction area present a sudden change in a first direction, second feature extraction area setting means which sets a second feature extraction area based on at least a pair of edges of distance corresponding to the first feature extraction area when they are extracted by the first edge extraction means, second edge extraction means which extracts an edge in an area in which the optical feature components of the original image information in the second feature extraction area present a sudden change in a second direction, and distance detection means which detects an obstacle when an edge extracted by the second edge extraction means shows a specified feature and detects the distance to the obstacle based on the spatial information of the edge.

For example, when detecting the distance from a first running vehicle to a second running vehicle located in front of the first vehicle, a supervision area which corresponds to the lane to which the owned vehicle belongs (the lane on which the owned vehicle is running) is set up. In the case in which this area only includes image information corresponding to the road face, a suitable search area is set up, for example, from the nearer front to the farther front, and the correlations between the optical feature components of image information that are included in the search area and the occupation area is sought, respective correlations provide approximate patterns. But, if there is a vehicle in front, there are given sections where light is shielded by that vehicle so that the correlation patterns in the search area of those sections become unique.

Now, it is possible to set up a feature area which includes image information corresponding to the vehicle in front as a first feature area by setting up conditions which detect unique patterns. The image information in this area changes spatially with small details. For instance, When paying attention in the horizontal direction, the optical feature components in sections which correspond to the side edges of the front vehicle, its tire, etc. change suddenly. A second feature extraction area is set up by extracting those edges and selecting a preferable width as a vehicle width. When image information corresponding to the front vehicle is included in this area, there exists an area in which the optical feature components in the vertical direction suddenly change, and the edges become a plurality of parallel line segments according to the general feature of the vehicle. When those edges are detected, the distance to the front vehicle is detected by conducting, for instance, a trigonometry survey based on spatial information.

As described above according to the invention the detection area, first feature area, and second feature area are set up successively as processing areas, and information included therein are compacted neatly, so that it is possible to accurately detect an obstacle such as vehicle, etc. with simple conditioning.

Furthermore, it is possible to accurately detect the distance to an obstacle such as vehicle, etc., form spatial information in the image information.

Other objects of the invention will become obvious as the description thereof proceeds with reference to the following drawings.

BRIEF DESCRIPTION OF THE DRAWINGS

FIG. 19b is an enlarged view to show the details of part of the drawing in FIG. 19a.

DESCRIPTION OF THE PREFERRED EMBODIMENTS

Figure 1:
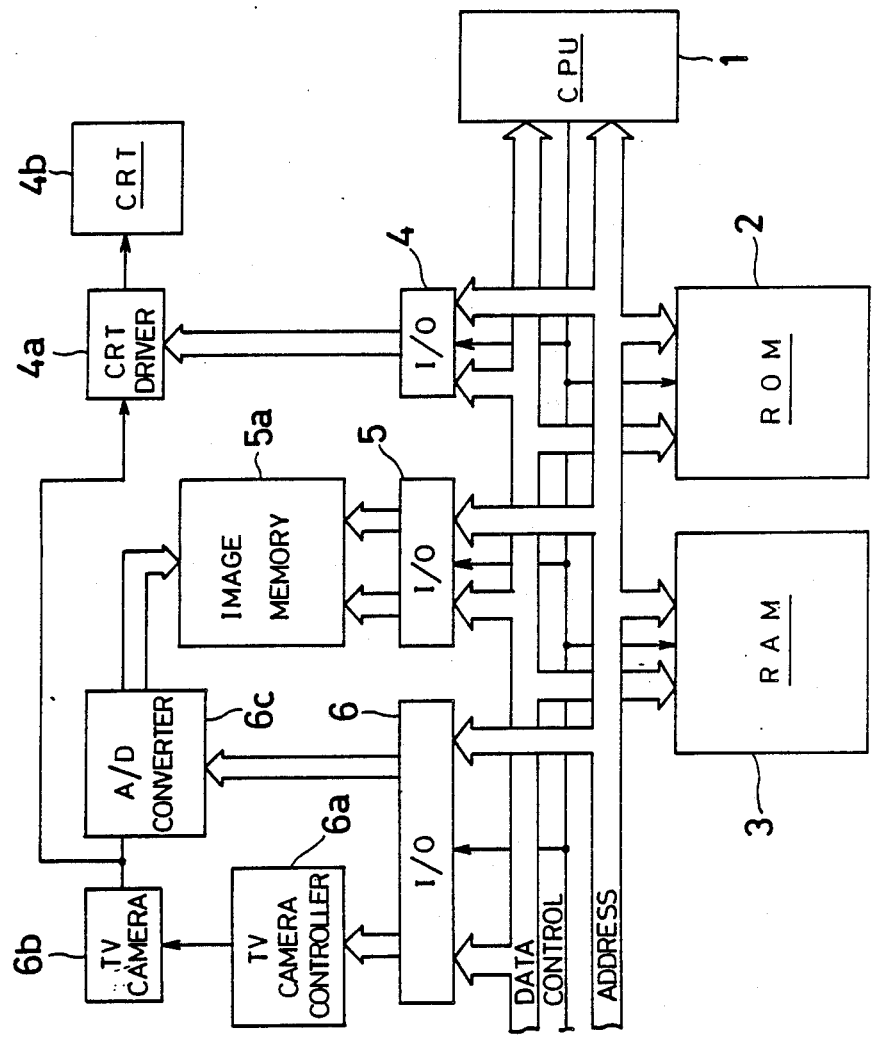
FIG. 1 is a block diagram showing the constitution of the system of a distance detector mounted on vehicle according to an embodiment of the invention.

FIG. 1 shows the system of a distance detector mounted on a vehicle according to a preferred embodiment of the invention. This system includes a microcomputer (hereinafter called CPU) 1 at its center. To its bus line a read only memory (ROM) 2 and a memory (RAM) 3 in which parameters are in process are stored and input, and output ports (I/O) 4, 5, and 6 to which constitution elements are connected and others are connected.

Figure 4:
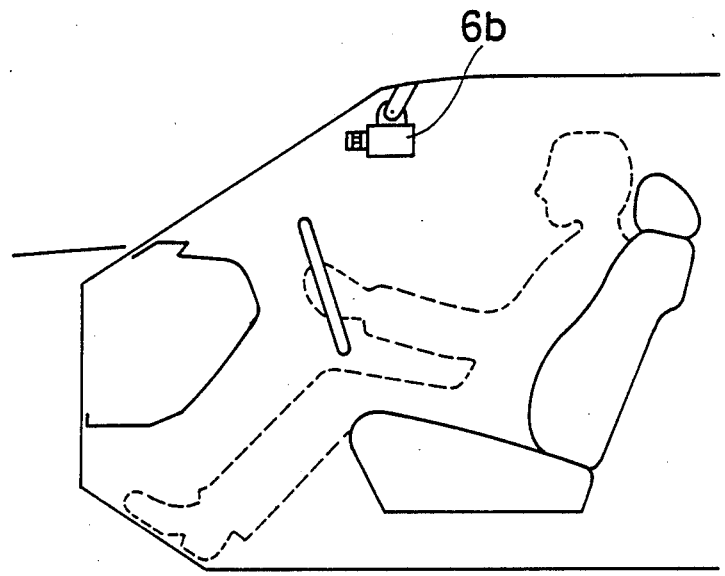
FIG. 4 is a side view of a vehicle, showing the mounting of a TV camera 6b which is shown in FIG. 1.

A TV camera 6b, shown in more detail in FIG. 4, is installed near the upper section of the center of the front window of the vehicle, and it takes pictures and outputs analog image signals for 512×480 image elements per frame. The analog image signal which is the output of TV camera 6b is supplied to an A/D converter 6c and a CRT driver 4a.

The A/D converter 6c converts the analog image signals from the TV camera 6b into digital data (tone data) in 256 tones (tone 0 represents black level and tone 255 white level) per image element.

The CPU 1 controls the iris diaphragm of the TV camera 6b, levels of image signals, etc. through a TV camera controller 6a, and it also synchronously controls the inputs and outputs of the A/D converter 6c and the writing process to an image memory 5a, and other processes.

The CRT driver 4a drives a CRT 4b which is provided near the center of an instrument panel according to the images supplied from the TV camera 6b. Namely, on a CRT 4b, the scenes in front of the vehicle which were photographed by the TV camera 6b can be seen.

Figure 2:
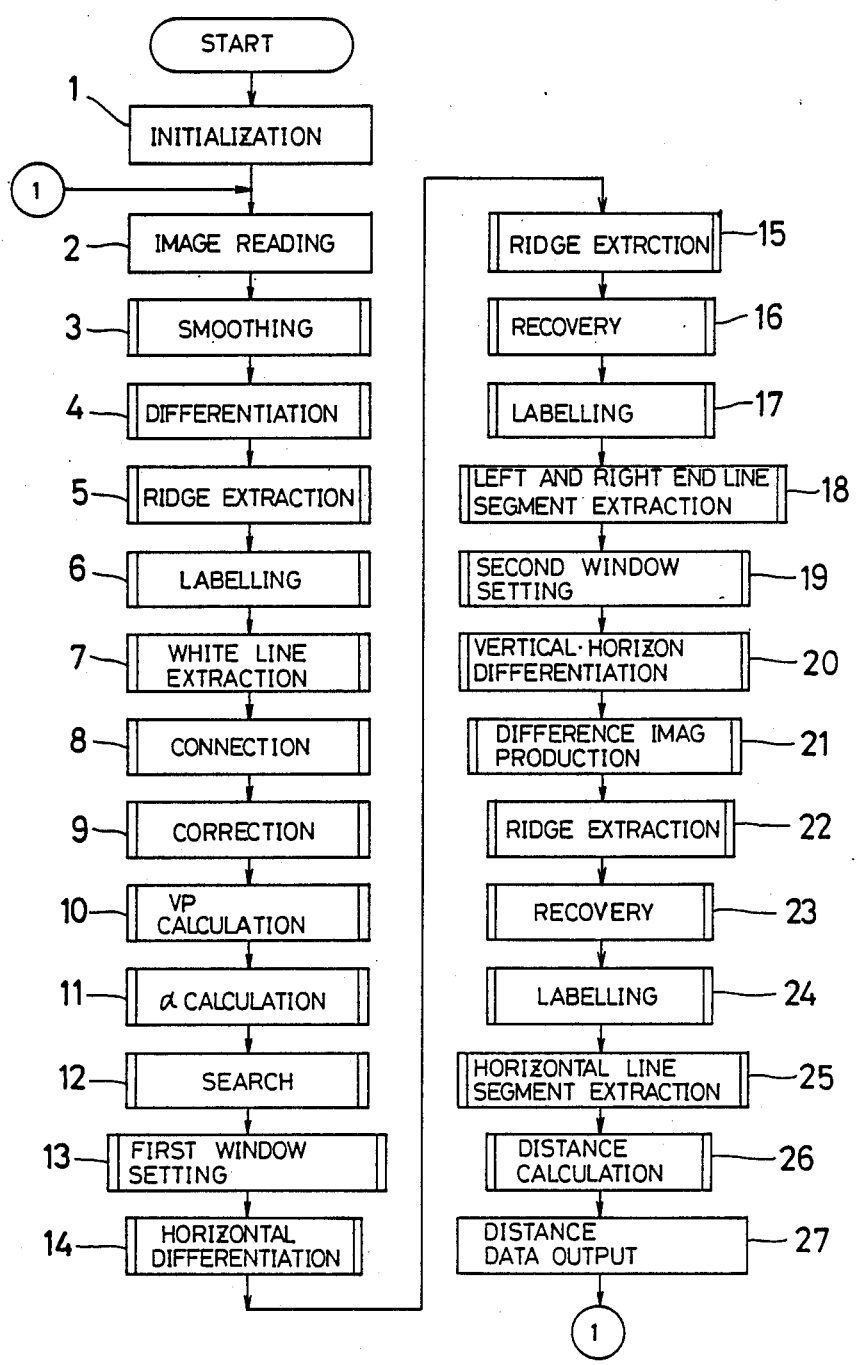
FIG. 2 is a flow chart which shows the outline of the operation of the microcomputer shown in FIG. 1.

Next, the operation in outline of the CPU 1 will be explained with reference to the general flow chart of CPU 1 which is shown in FIG. 2.

When electric power is connected to the CPU 1, in Step 1, the RAM 3, image memory 5a and every constitution element are initialized, and then the processes of steps 2-27 are repeated.

In Step 2, the TV camera 6b, A/D converter 6c and image memory 5a are controlled, and the tone data for 512×480 image elements per frame for the scenes in front of the vehicle which were photographed by the TV camera 6b are written in the image memory 5a.

Figures 5, 6:
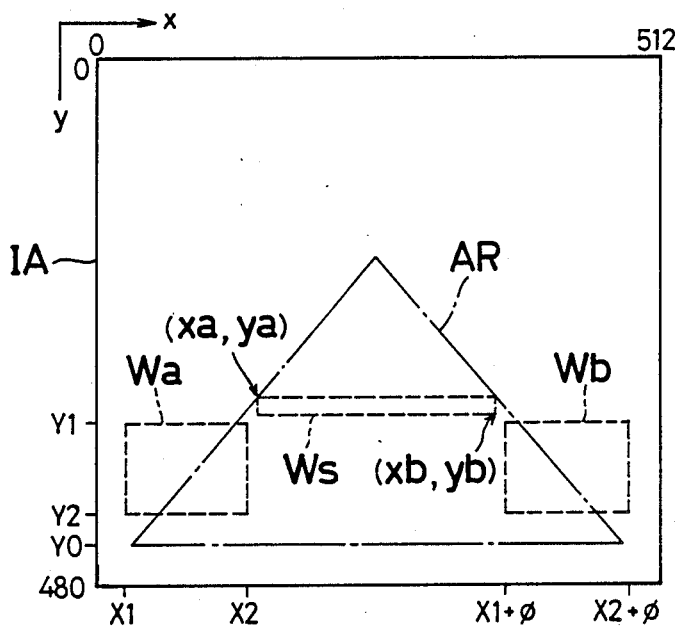
FIG. 5 is a plan view schematically showing the memory map in the image memory 5a shown in FIG. 1.
FIG. 6 is a plan view showing the coordinates of individual image elements in the 3×3 image element matrix set up by the microcomputer shown in FIG. 1.

FIG. 5 shows an area IA (hereinafter called original image area) of one frame in the image memory 5a. In the following description, the horizontal direction of the original image area IA is denoted by the x-axis (positive in the right direction), the vertical direction by the y-axis (positive in a downwards direction) and the coordinates of an image element which is included in the area are represented by (x, y).

In Step 3, by paying attention to individual data in the tone data in the original image area IA, a smoothing treatment is carried out in which the average of the tone data on the image element to which attention is directed and, further, eight (8) image elements surrounding said image element (that is, in the 3×3 image elements the central image element becomes the one to which attention is directed) replaces the original data of the image element of attention. (In the following processes the tone data are all subject to this smoothing.)

Noises of an isolated image element, etc. are suppressed by the smoothing and the change in the tones between two image elements become continuous. In this embodiment of the invention the number of image elements for which tone data was averaged for smoothing was changed in different numbers and from the results in the observation of the relation between the noise suppression and resolving power the number nine (9) of the image elements in the smoothing was determined.

In Step 4, the tone data included in the left white line extraction area $W_a$ (which is set in the original image area IA as shown in FIG. 5) is differentiated in the 45° direction (right turning is positive with reference to the x-axis) and the tone data included in the right white line extraction area $W_b$ is differentiated in the 135° direction. This is because the white lines for the vehicle running band divisions which extend on both sides of a vehicle have a certain degree of tilting, and in the 45° differentiation, tone data of the white line which extends on the left side (with an obtuse angle of tilting) has the edge of the white line extending on the left side emphasized, and in the 135° differentiation, tone data of the white line which extends on the right side (with an acute angle of tilting) has the edge of the white line extending on the right emphasized. And, in the differentiation, the portions where the tone data is spatially increased, or the portions where the tone data is spatially decreased, for example, on both edges of a white line are emphasized, but in this embodiment the latter is omitted.

In Step 5, the points of inflection in various directions in the 45° differential tone data and 135° differential tone data are detected, and the ridge for each edge is extracted. The width of this edge line becomes one image element.

In Step 6, the continuity of image elements of a ridge is noted and it is traced to effect labelling. In this case a line segment (ridge) which has continuous image elements less than five (5) is removed as noise. This number five (5) of the image elements which is used for the basis of judgment has been obtained by experiment.

In Step 7, a preferable line segment, such as a white line on the right side of a vehicle, and a preferable line segment such as a white line on the left side of a vehicle are examined from the line segments which were labelled. At this time, the standard of judgment is based on experimental data.

In Step 8, out of the line segments that were examined and selected, the longest line segment which is preferable for the white line on the right side of a vehicle, and the longest line segment which is preferable for the white line on the left side of a vehicle are selected and extracted, and other line segments are consolidated to those longest lines. In this case, the extensions of those longest line segments are given a width equal to ±7 image elements at right angles to the extensions, and line segments which are outside the width are omitted.

In Step 9, an equation for the right side white line is sought from the longest line segment which is preferable for a white line on the right side of a vehicle out of the consolidated line segments, and the second longest line segment (if there is none, only the longest line segment is used), and an equation for the left side white line is sought from the longest line segment which is preferable for a white line on the left side of a vehicle, and the second longest line (if there is none, only the longest line segment is used) out of the consolidated line segments.

In Step 10, the equation for the right side white line and the equation for the left side white line are combined as simultaneous equations and the coordinates of the point of intersection given by them, namely the perspective point VP are sought.

Figure 19A:
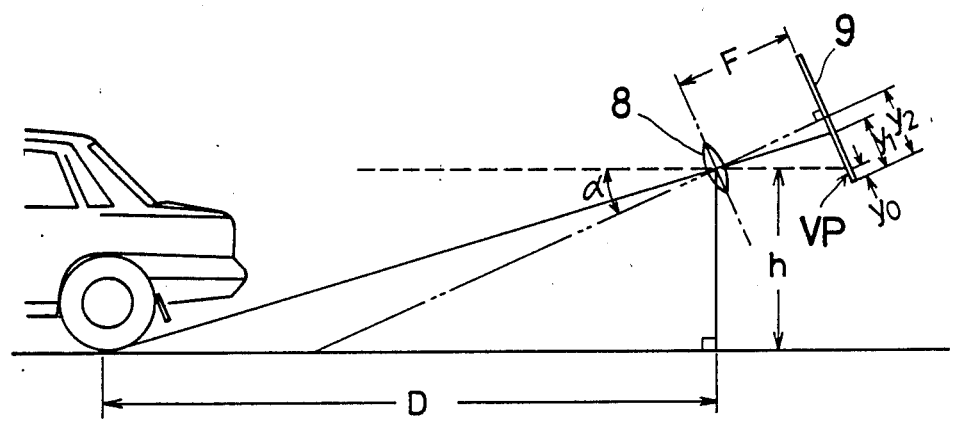
FIG. 19a is a drawing to explain the principle of distance detection.

In Step 11, the angle $\alpha$ which is produced by the optical axis of the TV camera 6b and the horizontal line is sought from the coordinates of the perspective point VP. For this angle refer to FIG. 19a. The perspective point VP corresponds to the projection of the horizontal line so that the tangent of the angle $\alpha$ is represented by the ratio of the focal length of the TV camera 6b and the difference of the y-coordinate, $y_2$ of the projection point of the optical axis and y-coordinate, $y_0$ of the perspective point VP. Namely the tangent of the angle $\alpha$ is given by:

$$\alpha = \arctan(y_2 - y_0)/F \quad (1)$$

In Step 12, a search window $W_s$ (see FIG. 5) is set up in the supervision area AR which is defined by an approximation line of the right side white line and an approximation line of the left side white line and the end line of the bonnet and tone data included in the search window $W_s$ is investigated.

The search window $W_s$ is the area of a rectangle (in this embodiment it occupies 15 image elements) which is in the y-direction and inscribes the supervision area AR, and the search window $W_s$ is set up by renewing by $-m$ (in this embodiment m=10 image elements) of y-coordinate form the position which touches the bottom side of the supervision area. In other words, in the search process every search window is successively renewed upwards by m. In this search process, a tone histogram that shows the number of image elements per each tone data contained in the first search window $W_s$ is produced, and the tone which corresponds to the maximum value in said histogram is set as the tone representing the image elements corresponding to a road surface. The same histogram is produced based on the next search window $W_s$, and if the tone which corresponds to the peak that is the lowest in tone and appeared in the histogram is substantially equal to the tone representing the image element corresponding to the road surface, that tone is set by renewal as a new tone representing the image elements corresponding to the road surface. This process is repeated, and when the difference of the tone which corresponds to the peak that is the lowest tone in the histogram that was made in the renewal and the tone that represents the image elements corresponding to the road surface and set before said histogram goes over an allowable range, the search process is finished there.

In Step 13, a first window is set based on the search window $W_s$ which was set up when the search was finished. This first window has its bottom side equal to the search window $W_s$ and is a rectangular area which has height corresponding to the y-coordinate at the time of the last search.

In Step 14, the tone data contained in the first window (W1) (see FIG. 16a) is differentiated in the horizontal direction. If the vehicle in the front is included in this area, the edges in the vertical components of the side edges, tires and so on are emphasized by horizontal differentiation.

In Step 15, the spatial point of inflection in the horizontal differential tone data is detected and a ridge (vertical line segment) with the line width of one image element is extracted.

In Step 16, each ridge is expanded in the upward direction and downward direction by one image element, and then the ridge after expansion in the up-and-down directions by one image element is shrinked to return it to the original proportion. With this process, ridges that have a maximum gap of two image elements between adjacent ridges are connected.

In Step 17, in the same way as mentioned above, image elements of each ridge are traced, noting their continuity, and then labelling is applied. If, in this labelling, a line segment whose image elements are less than 10% of the height of the first window is omitted as noise.

In Step 18, from line segments to which labelling was given, a pair of preferable line segments such as a line segment which shows both ends of the vehicle in front are examined. If they are the line segments that show both ends of the vehicle in front, their inclination is nearly vertical and the distance between them can be limited to a certain extent by the y-coordinates. Now the first window is divided into right and left from the center and a line segment which as an inclination over 1.1 (based on experimental data) in the right side area and distance from the longest line segment in the x- direction in a set range and an inclination over 1.1 in the left side area is searched. If this line segment cannot be found, the right and left are exchanged and again the line segment is searched. If still it is not found, the above search is repeated for the next longest line segment. If the line segment exists only in either one area, or if a line segment is left in either one of the areas after repeating the above search, the first window is shifted in the direction of that area and the search is repeated from Step 14. If the line segment does not exist in both areas, or if no line segment is left in either one of both areas, the search is returned to Step 12 and it is continued.

Figure 16A:
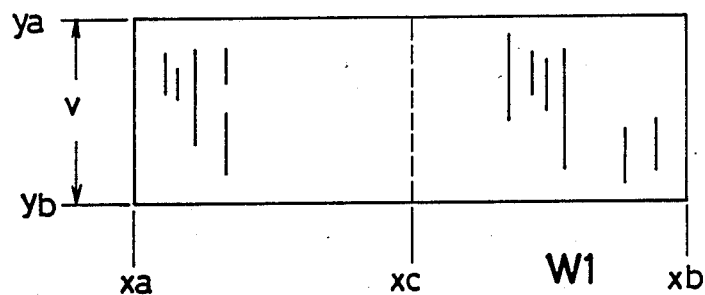
FIG. 16a and FIG. 16b are plan views which show, respectively, a first window W1 set up by the microcomputer 1 shown in FIG. 1, and a second window W2 set up by the microcomputer 1 shown in FIG. 1.
Figure 16B:
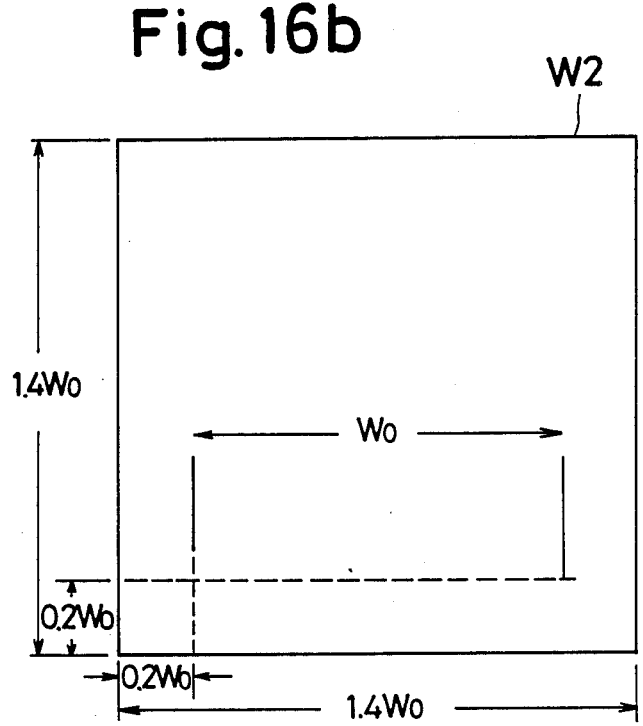

In Step 19 a second window is set up based on the extracted left and right end line segments (see FIG. 16b). This second window (W2) is a square area as shown in FIG. 16b which has one side length equal to 1.4 $w_0$ where the distance between the left and right end lines segments is $w_0$. Each line segment is at the distance of 0.2 $w_0$ from both sides in the direction of the x-axis in this area and at the distance of 0.2 $w_0$ from the bottom side of the lower end (y-coordinate is large) in the direction of y-axis. The method of setting up this second window $W_2$ is based on the experiment, but the whole images of most vehicles can be received in this area.

Figure 17A:
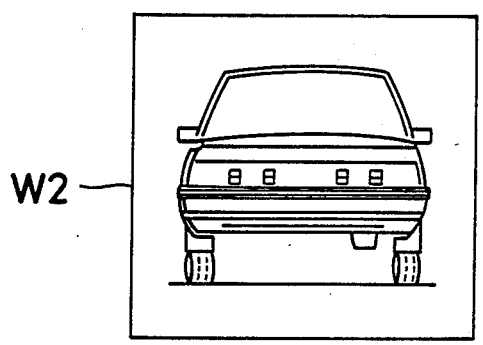
FIG. 17a is a plan view to show an image in the second window W2.
Figure 17B:
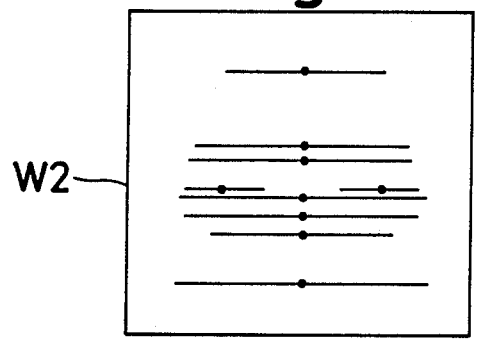
FIG. 17b is a plan view in which the image in FIG. 17a is subjected to a ridge extraction process.

In Step 20, the tone data included in the second window $W_2$ is differentiated in the vertical and horizontal directions. In the vertical differentiation, the edges in the horizontal component of the roof of the front vehicle, upper edge of luggage compartment, lower ends of body and the shadow reflected from the road surface, etc. are emphasized. For example, when each data of the image shown in FIG. 17a is differentiated vertically the edges as shown in FIG. 17b are extracted (Note: ridge extraction is applied in FIG. 17b).

In Step 21, the difference of differentiated tone data in the vertical and horizontal directions is taken to produce a difference image. This is a process to make clean both end sections of the edge in the horizontal component.

In Step 22, the spatial point of inflection of the differentiated data of the difference image is detected and a ridge (substantially horizontal line segment) the width of which is one image element is extracted.

In Step 23, each ridge is expanded by one image element in the left and right directions and then the ridge after the expansion is shrinked by one image element in the left and right directions to return it to the original ridge. With this, ridges that are apart by two image elements are connected.

In Step 24, as mentioned above, each ridge is traced, noting the continuity of the image elements in ridges and labelling is applied to them. In this labelling of a line segment, the continuous image elements of which are less than 30% of the width of the second window $W_2$, is omitted as noise.

In Step 25, in the case in which line segments to which labelling is applied are more than 3 in number, it is judged that a vehicle is in front, and the second window $W_2$ is shifted so that the line segment farthest downward (largest y-coordinate) becomes the center in the y-direction of the second window $W_2$, which is shifted with the tone data corresponding to this line segment taken as threshold limit value is given a binary digit value. According to an experiment if, in giving two digit value, the rate of black image elements (rate of occupation by image elements which have a tone lower than the threshold limit) in the upper half is over 20% and the rate of white image elements (rate of occupation by image elements which have a tone higher than the threshold limit) is over 85%, the line segment (the lower line segment, which is the line of the second $W_2$ at present) can be specified to a line which shows the boundary between the vehicle in front and the road surface.

Figure 19B:
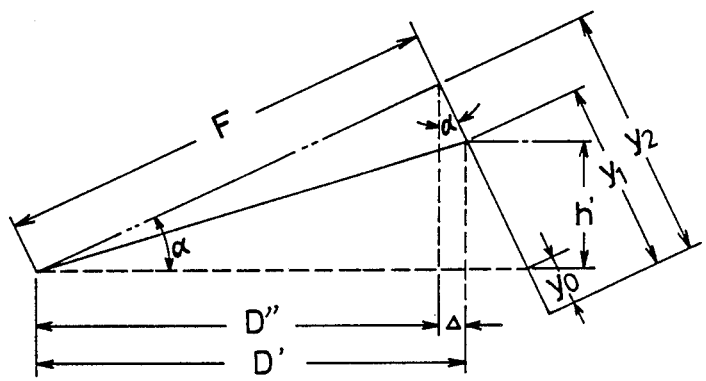

In Step 26, from the y-coordinate $y_1$ of the line segment which shows the boundary between the vehicle in front and the road surface, the distance (D) to the vehicle in front is sought. For this distance, refer to FIG. 19a and FIG. 19b which is an enlargement of part of FIG. 19a. In reference to those figures.

$$D/h = D'/h' \quad (2)$$
$$\therefore D = D \cdot h/h' \quad (3)$$

Further, $$D' = D' + \quad (4)$$
$$= F\cos + (y_2 - y_1)\sin$$
$$h' = (y_1 - y_0)\cos \quad (5)$$
$$D = F + (y_2 - y_1)\tan \cdot h/(y_1 - y_0) \quad (6)$$

Substituting in (6) $y_0$, $y_1$ and $\alpha$ which were sought in the above-mentioned processing, the distance D is calculated.

In Step 27, the data representing the calculated distance is transferred to CRT driver 4a.

The CRT driver 4a displays, in letters, the data near the detected vehicle.

The above description gives the general outline of the processes by the CPU 1, and now the specific details of each processing will be explained below.

Figure 3A:
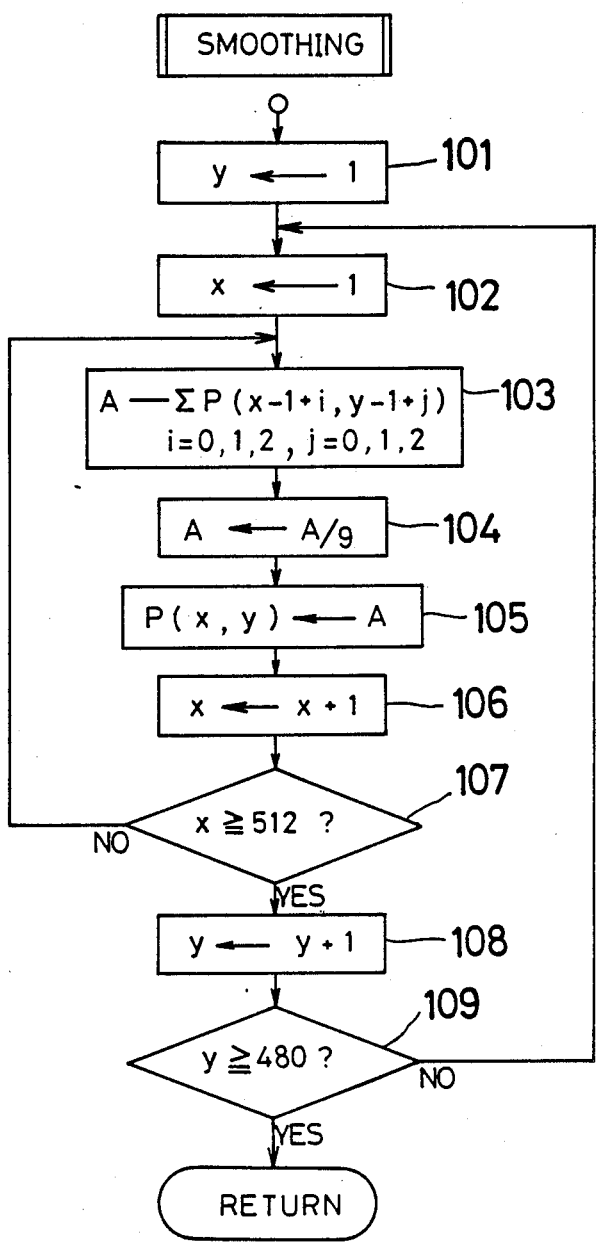
FIG. 3a, 3b, 3c, 3d, 3e, 3f, 3g, 3h, 3i, 3j, 3k, 3, l 3m, and 3n are flow charts which show the detail of the process in the flow charts shown in FIG. 2.

In reference to the flow chart shown in FIG. 3a, the smoothing operation of Step 3 will be explained in detail.

In Step 101, the y-coordinate is set at 1, and in Step 102, the x-coordinate is also set at 1.

P(x, y) is an area specified by the address (x, y) in the memory P, or by data stored therein, namely it is to show the data corresponding to the image element specified by the coordinates (x, y) in the original image area (hereinafter the same meaning). In this case, the tone data for each image element is stored in the memory P.

In Step 103, attention is paid to the image element at the coordinates (x, y) and its tone data, and tone data of 8 image elements adjacent the image element in attention are added. Refer to FIG. 6 in which the relation between the coordinates of the image element of attention and the coordinates of 8 image elements adjacent to the image element in attention is shown.

Figure 8:
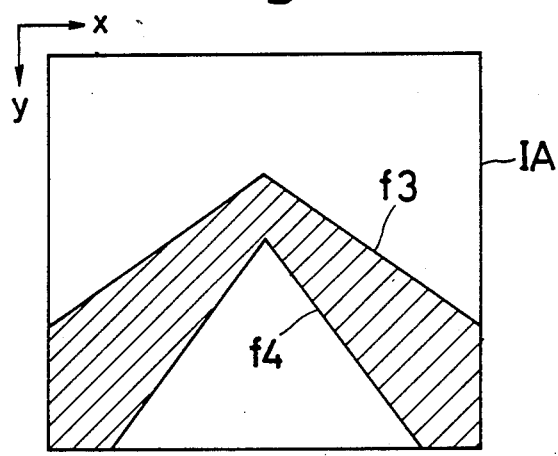
FIG. 8 is a plan view showing an extraction area of the white line.

Further, in the following description of the image element in attention as shown in FIG. 8, and 8 adjacent image elements will be called a 3×3 image element matrix.

In Step 104, an average data is sought by dividing the total additional data by 9, and it is stored in the area (x, y) in the memory P.

In Step 105, the area specified P (x, y) is set as the average data.

In Step 106, x-coordinate is given one increment, and the processes from Step 103 to Step 106 are repeated until the x-coordinate becomes 512.

When the x-coordinate becomes 512, y-coordinate is given one increment and the process returns to Step 102.

The above-mentioned processes are repeated in the number of luster scanning until the x-coordinate becomes 512 and y-coordinate 480.

Figure 3B:
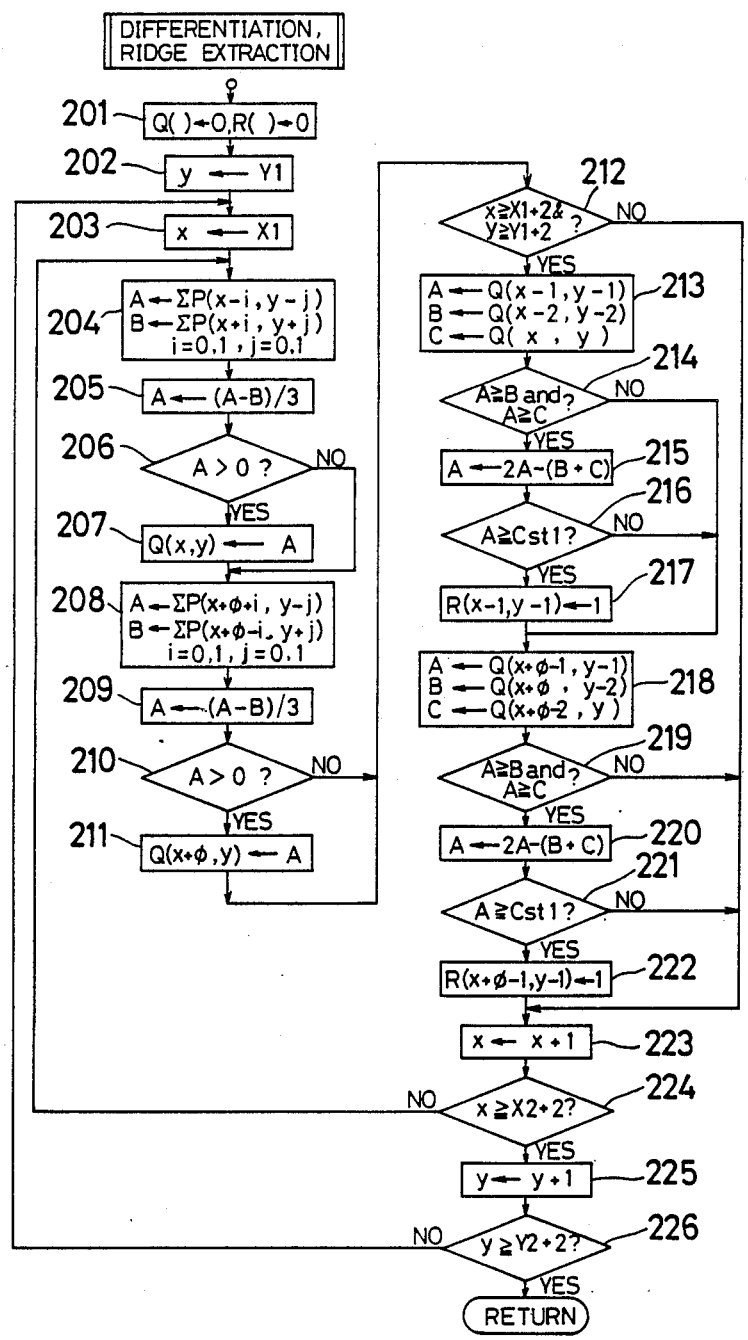

In FIG. 3b a flow chart which processes simultaneously the differentiation conducted in the Step 4 of the flow chart in FIG. 2, and the ridge extraction process conducted in Step 5 is shown. The explanation below refers to this figure.

In Step 201, whole areas of memory Q and memory R are cleared.

In the left side white line extraction area $W_a$ is, as shown in FIG. 5, a rectangular area specified by the diagonal coordinates (X1 and Y1), (X2, Y2) and the right side white line extraction area $W_b$ is the area which is the above specified area for $W_a$ with parallel displacement of $\phi$. Accordingly, in Step 202, the y-coordinate is set at Y1 and in Step 203, the x-coordinate is set at X1.

Steps 203–207 show the 45° differentiation with attention paid to P (x, y).

The 45° differentiation process is a process to seek the difference of the tone data for the left upper 3 image elements in the 3×3 image element matrix, and the tone data of the right lower 3 image elements, namely the variation of the tone data in a 45° direction.

In practice, in Step 204 the values of i and j are changed to 0 and 1 respectively, and after the total sum of the tone data of the left upper four (4) image elements including the image element in attention is loaded in the A register, and the total sum of the tone data of the right lower four (4) image elements, including the image element in attention is loaded in the B register. In Step 205 the content of the B register (the tone data of the image in attention which both A register and B register include is offset in this subtraction) and the differences are averaged (divided by 3) and the average is reloaded in A register.

Because in this embodiment the case in which the tone data changes to decrease is omitted as described above, only when the content of the A register goes over 0 in Step 206, is it stored in the area (x, y) of the memory Q as differential tone data.

Steps 208–211 show the differential process with attention paid to P (x+$\phi$, y).

The 135° differential process is a process to seek the difference of the tone data of the right upper three (3) image elements and the tone data of the left lower three (3) image elements in 3×3 image element matrix, namely the variation of tone data in the direction of 135°. The actual method in this process is exactly the same as the 45° differential process except for the difference in the coordinates which is the object of the differentiation. The explanation is, therefore, omitted.

Steps 213–217 show the ridge extraction processing at 45° (process in the direction of 45°) which extracts ridges that have an inclination of obtuse angle from the differential tone data, and Steps 218–222 show the ridge extraction process at 135° (process in the direction of 135°) which extracts ridges which have an inclination of acute angle from the differential tone data.

The 45° ridge extraction processing uses the image element in attention and the image element that is diagonally upper left to the element in attention and the image element that is diagonally lower right to the element in attention in the 3×3 image element matrix so that it is possible to effect the 45° ridge extraction process with attention paid to the image element with the coordinates of (X1+1, Y1+1) when the 45° differentiation process for P (X1+2, Y1+2) is finished, namely at the time when the 45° differential tone data is planted.

In the 135° ridge extraction process the tone data of the image elements in the 3×3 image element matrix in the diagonal line pointing upward to the right, namely the image element in attention and the upper right and lower left image elements are used so that it is possible to effect the 135° ridge extraction process with attention paid to the image element of the coordinates (X1+$\phi$+1, Y1+1) when the 135° differential process is over, namely at the time when the 135° differential tone data is planted at $\phi$(X1+$\phi$, Y1+2). This means that, if a condition that x-coordinate is over (X1+2) and y coordinate is over (Y1+2) is added, the ridge extraction processing can be done with the differential process at the same time. This judgment is carried out in Step 212.

When x-coordinate is (X1) or (X1+1) or y-coordinate is (Y1) or (Y1+1), the process jumps to Step 223 to give an increment to the x-coordinate, and if its value is lower than (X2+1). Step 212 returns to Step 204 to repeat the differential process, and if the value of x-coordinate becomes larger than (X+2), y-coordinate is incremented by one increment in Step 225 and the x-coordinate is reset to (X1) in Step 203 and the differential process is repeated.

When x-coordinate is larger than (X1+2) and y-coordinate is over (Y1+2), first, the 45° ridge extraction process in Steps 213–217 are executed.

In this process, the differential tone data Q(x−1, y−1) of the image element in attention is loaded to the A register and the differential tone data of the left upper image element Q(x−2, y−2) is loaded to the B register, respectively, in Step 213, and the differential tone data Q (x, y) is loaded to the C register.

When only the content of the A register is larger than the content of the B register and the C register, and the value of two times the content of the A register from which the sum of the contents of the B register and C register is extracted is larger than a specified value $C_{st}1$, Step 214 proceeds to Steps 215 and to Step 216 and to Step 217, and 1 (there is a ridge) is planted to the area (X−1, y−1) of the memory Q.

Following the above process, the 135° ridge extraction process in Steps 218–222 are executed, and the actual method is the same as the above mentioned 45° ridge extraction process except for the difference in the coordinates of the image element which is the object of the process, so that the explanation is omitted.

After this, x-coordinate is incremented by one increment in Step 223, and the process returns to Step 204. When the x-coordinate becomes equal to or greater than (X2+2), the y-coordinate is incremented by one increment and the process returns to Step 203. With the above described method, the differential process and ridge extraction process are executed simultaneously to luster-scan the image elements in the window $W_a$ and window $W_b$ from above.

Figure 3C:
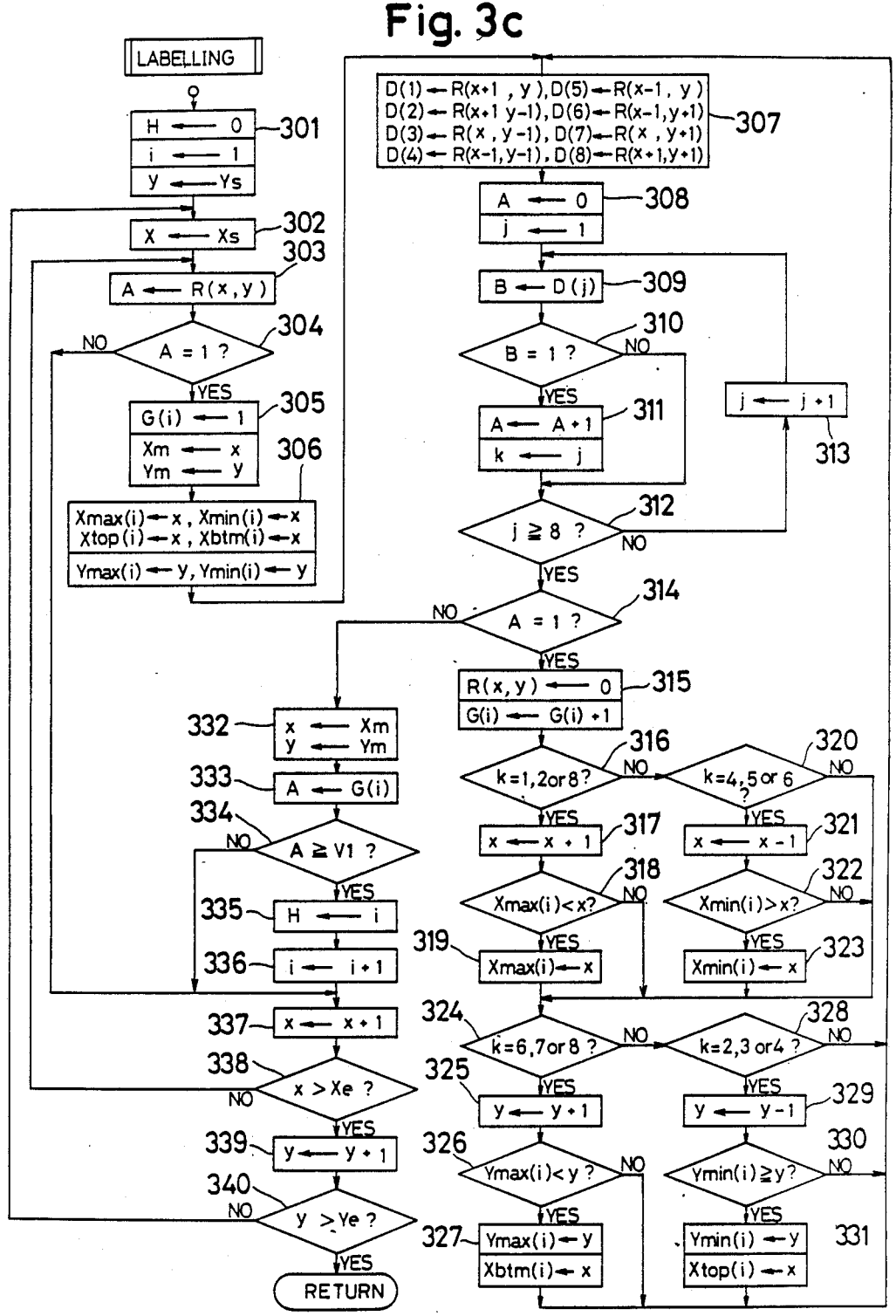

FIG. 3c is a flow chart to show in detail the labelling process. When this is done in Step 6 in the flow chart of FIG. 2, a constant value V1 used for this process is specified to six (6), Xs to X1, $Y_s$ to Y1, $X_e$ to X2+$\phi$+1, and $Y_e$ to Y2+1, respectively.

In Step 301, the memory H is cleared (0), and the value of i is set to 1, and the y-coordinate to $Y_s$, that is Y1.

In Step 302, x-coordinate is set to $X_s$, that is to X1.

In Step 303, the ridge data R (x, y) of the image element in attention is loaded to the A register. If this data is not, "1: there is a ridge", then the process proceeds to Steps 337 and 338, or Steps 337, 338, 339, and 340, and the x and y coordinates are renewed, and the inside of the area of the diagonal coordinates of which are specified by $(X_s, Y_s)$ and $(X_e, Y_e)$ are luster-scanned.

If an address planted in "1" of the memory R is detected by the above mentioned process, the luster-scanning is stopped at that position once, and in Step 305 "1" is planted in the area i (the area specified by i: this applies to the following) of the memory G in which continuous image elements are planted, and x-coordinate at that time is evacuated to the memory $X_m$ and y-coordinate to the memory $Y_m$. In other words, the coordinates at the time of stopping the luster-scanning are evacuated to the memories $X_m$ and $Y_m$.

In Step 306, the x-coordinate at that time is planted in i areas in the memories Xmax, Xmin, Xtop, and Ybtm x-coordinate, and in i areas of Ymax and Ymin the y-coordinate at that time is planted.

In Step 307, in order to make the following processes easy, the ridge data for the image element in attention and the eight (8) adjacent image elements are planted in the memories D (1) to D (8).

The relation of correspondence between the memories D (1) to D (8) and respective coordinates of the eight (8) adjacent image elements are shown in FIG. 6.

In Steps 308 to 313, the contents of the memories D (1) to D (8) are detected, and the number of "1: there is a ridge" in the ridge data for the eight (8) adjacent image elements is counted. If the number of the count is not 1 (Step 319), then the process proceeds to Step 332 from Step 314 because the image element in attention is not an edge image element, and the coordinates that are evacuate to Xm and Ym when the luster-scanning is stopped are called back.

In G (i), the number of continuous image elements of ridge that were detected in the i-th detection is planted as explained below, and if the number is not over V1 (in this case V1=6), the process proceeds to Step 337 and the luster-scanning is reopened.

When edge points of a continuous ridge are paid attention, the image element of the ridge data "1" only is included in the eight (8) adjacent image elements. When this image element is detected, the ridge data corresponding to the image element in attention is deleted in Step 315, and the image element data G (i) is counted up by 1.

In this case the value of k which is set in Step 311 corresponds to the next image element in attention of the memory D, that is the address of the image element of the ridge data "1" which is included as only one in the eight (8) adjacent image elements which is paid second attention. (See FIG. 6)

If the value of k is 1, 2 or 8 the image element next to the image element in attention to the right or to the upper right or to the lower right is the image element in second attention, so that in Step 317, the x-coordinate is incremented by one increment.

In Step 318, the maximum value $X_{max}$ of the x-coordinates in a continuous ridge which is the maximum up to that time, is compared with the x-coordinates at that time, and if the latter is larger than the former, the maximum value is renewed.

If the value of k is 4, 5, or 6, the image element next to the image element in attention to the upper left or to the left or the lower left is the image element which is paid second attention, so that in Step 321, the x-coordinate is incremented by one increment.

In Step 332 the minimum value Xmin (i) of the x-coordinates in a continuous ridge up to that time, is compared with the x-coordinate at that time, and if the latter is smaller than the former, the minimum value is renewed.

If the value of k is 6, 7 or 8, the image element next to the image element in attention to the lower left, to the below right, or to the lower right is the image element in second attention, so that the y-coordinate in Step 325 is incremented by one increment.

In Step 326, the maximum value Ymax (i) of the Y-coordinates in a continuous ridge up to that time is compared with the y-coordinate at that time, and if the latter is larger than the former, the maximum value is renewed and, further, the x-coordinate corresponding to the new maximum value is planted in the area (i) of the memory $X_{btm}$.

If the value of k is 2, 3 or 4, the image element next to the image element in attention to the upper right, to above right, or to the upper left is the image element in second attention, so that the y-coordinate is incremented by one increment in Step 329.

In Step 330, the minimum value $Y_{min}$ (i) of the y-coordinates in a continuous ridge up to that time is compared with the y-coordinates at that time, and if the latter is smaller than or equal to the former, the minimum value is renewed and the x-coordinate corresponding to the new minimum value is planted in the area (i) of the memory $X_{top}$.

The image element in the next attention, that is the ridge data which was included as only one image element out of the eight (8) adjacent image elements up to that time, is moved to the image element of "1" by the processes of Steps 318 to 331. Because at this time the ridge data of the "image element in attention up to that time" has been deleted in Step 315 the image element in attention which was removed and set, can still be the image element at the edge point.

To repeat the above described processes is to trace a continuous ridge from the end point at one end to the end point at the other end, and at other end points the ridge data of the eight (8) adjacent image elements all become "0", and the process proceeds from Steps 314 to 332.

At this time, the x-coordinate of the farthest right end image element of the ridge is planted in the memory $X_{max}$ (i), the x-coordinate of the farthest left end image element of the ridge in the memory Xmin (i), the y-coordinate of the lower end image element of the ridge in Ymax (i), the x-coordinate of an image element at the right end for a ridge with an obtuse angle inclination or an image element at the left end (image element on the lowest end means hereinafter this image element) for a ridge with an acute angle inclination out of the image elements on the lowest end to the memory Xbtm (i), the x-coordinate of the image element at the top most end of the ridge to the memory Ymin (i), and the x-coordinate of an image element at the left end for a ridge with an obtuse angle inclination or an image element at the right end (image element at the top most end means hereinafter this image element) for a ridge with an acute angle inclination to the memory Xtop (i).

Figure 7:
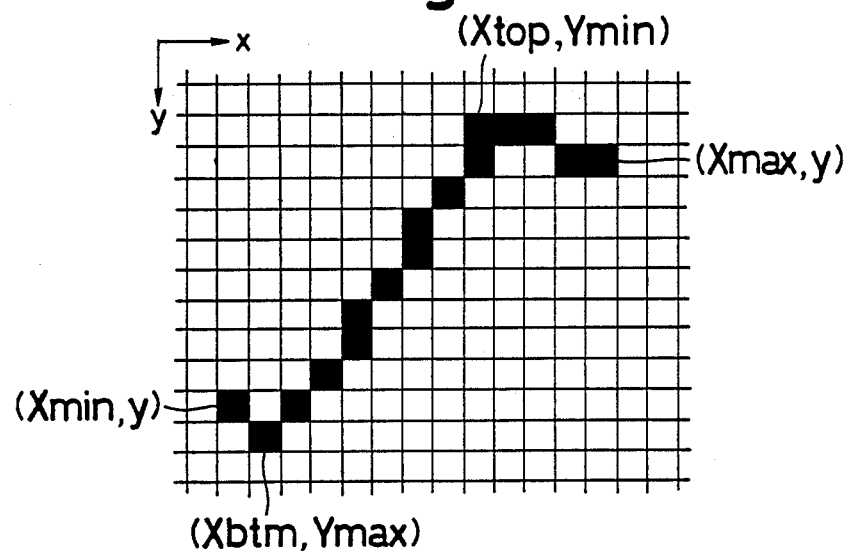
FIG. 7 is a plan view which shows, as an example a ridge extracted in the ridge extraction process by the microcomputer shown in FIG. 1.

Refer to FIG. 7 which shows the relation between a continuous ridge and data planted at memories Xmax, Xmin, Xtop, Xbtm, Ymax and Ymin. (In FIG. 7 data is abbreviated as Xmax, Xmin, Xtop, Xbtm, Ymax and Ymin and an arbitrary y-coordinate as y.)

In Step 332 if the coordinates of Xm and Ym which were evacuated at the time when the luster scanning was stopped are called back, the image element number data G (i) for the ridge detected at that time is loaded to the A register. In Step 6 of the flow chart shown in FIG. 2, if this process is conducted, a ridge, the total image elements of which is less than six (6) in number is omitted as noise (the number 6 was determined by experiment). Accordingly, if the value of the A register is over six (6), the value of (i) in Step 335, that is the number of ridges which were detected and continuous and which do not belong to noise is planted in the memory H. In other words, with this process, ridges in the number of i and data on them are registered in each memory.

After Step 336, the value of i is incremented by one increment, the luster-scanning is reopened, and the detection of the image element of an end point in the next ridge is continued.

Figure 3D:
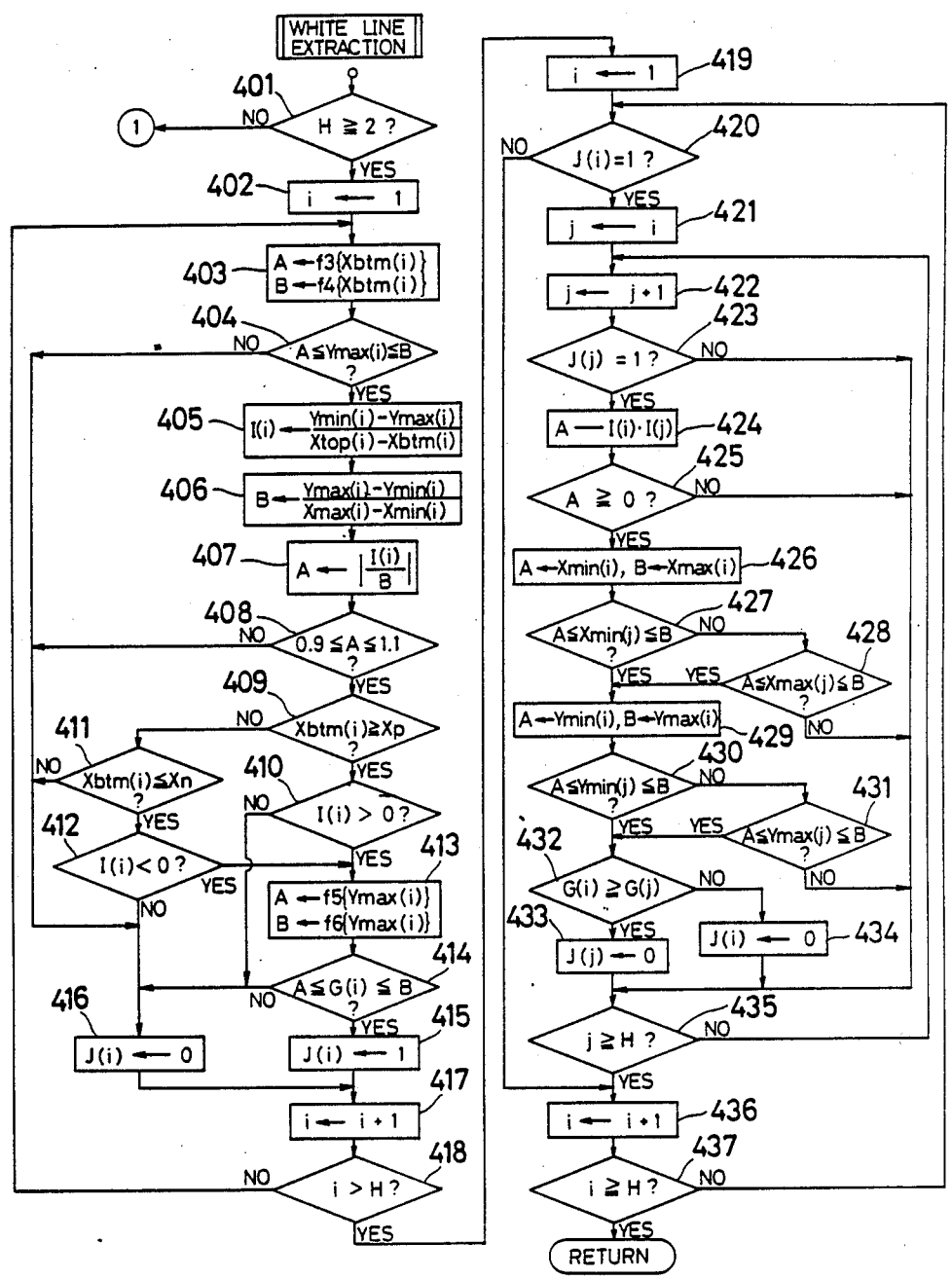

The flow chart shown in FIG. 3d shows in detail the white line extraction process which is executed in Step 7 of the flow chart shown in FIG. 2.

In Step 401, the content of the memory H, (i.e., the registered number of ridges) is examined. If the registered number of ridges is less than 1, it is regarded as a mistake in sampling and the process is returned to Step 2 of the flow chart, and it starts again from image reading.

Figure 13:
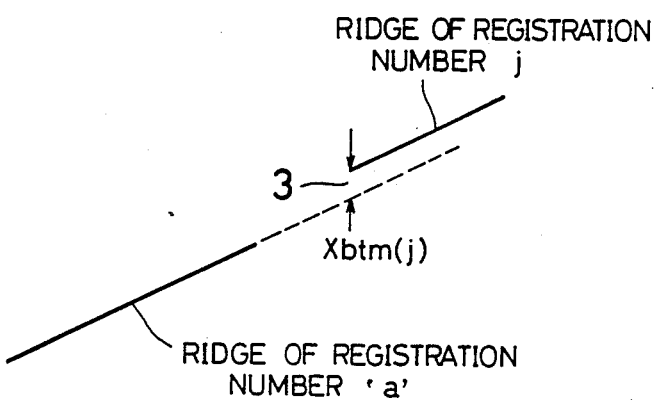
FIG. 13 is a drawing to explain the connection process which the microcomputer shown in FIG. 1 performs.

If the registered number of ridges is equal to or more than 2, then the value of i is sent to 1, and the following examination is started from the ridge with registered number 1.

f3 and f4 are, as shown in FIG. 13, functions which limit the distribution area of ridges which are preferable for perspective point detection and the distribution of white lines when a vehicle is running to the farthest right side white line and when it is running to the farthest left side white line was obtained by actual experimentation. In other words, in Step 403 and 404, ridges outside of the area which stands between those two functions are omitted.

Actually, the x-coordinate Xbtm (i) of the lowest image element of the ridge under examination is substituted into the functions f3 and f4, and it is examined whether or not the y-coordinate of the lowest image element, $Y_{max}$ (i) is included in the area bounded by those function values. If it is included, the process proceeds to Step 405 and so on, and if it is not included 0 is planted in the area i of the memory J in Step 416 (deletion of ridge).

In Step 405, the inclination of a straight line which connects the highest image element and the lowest image element of the ridge (this line inclination is hereinafter called ridge inclination) is sought and it is planted in the area i of the memory 1.

In Step 406, the ratio of the lateral side and longitudinal side of a rectangular area (which the ridge under examination inscribes) is planted in register B. This is, as obvious in reference to FIG. 7, is the ratio of the x-coordinates of the image element to the farthest right and the image element to the farthest left.

Figure 9:
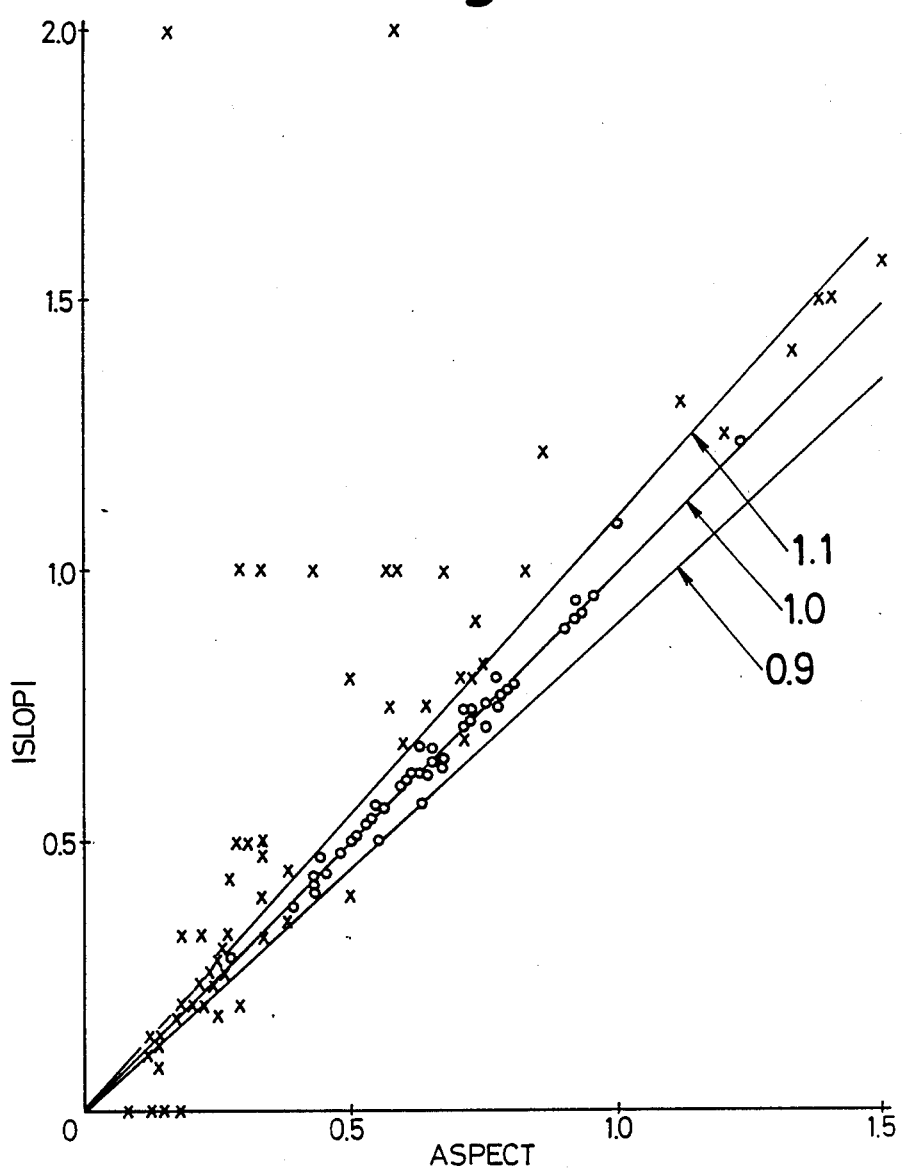
FIGS. 9, 10, 11, and 18 are graphs produced based on actual measured data.

In Steps 407 and 408, the ratio of the content of the memory I (i) and the value of the B register is investigated. Refer to FIG. 9 for this investigation. In FIG. 9 'ASPECT' means the B register in this case, and [SLOP] the content of the memory I (i). namely the absolute value of the ridge inclination. In this graph, the data obtained is the actual measurement on the white line on the right side and on the left side of the vehicle is marked by 0, and noises are shown by x mark, and it can be seen that 0 marks are collected to the range where the ratio of SLOP and ASPECT is 0.9 to 1.1.

Accordingly, if the ratio is not in the range of 0.9 1.1, it is considered that the ridge is not suitable for detecting a perspective point, and the flow line proceeds to Step 416 and this ridge is omitted.

Figure 10:
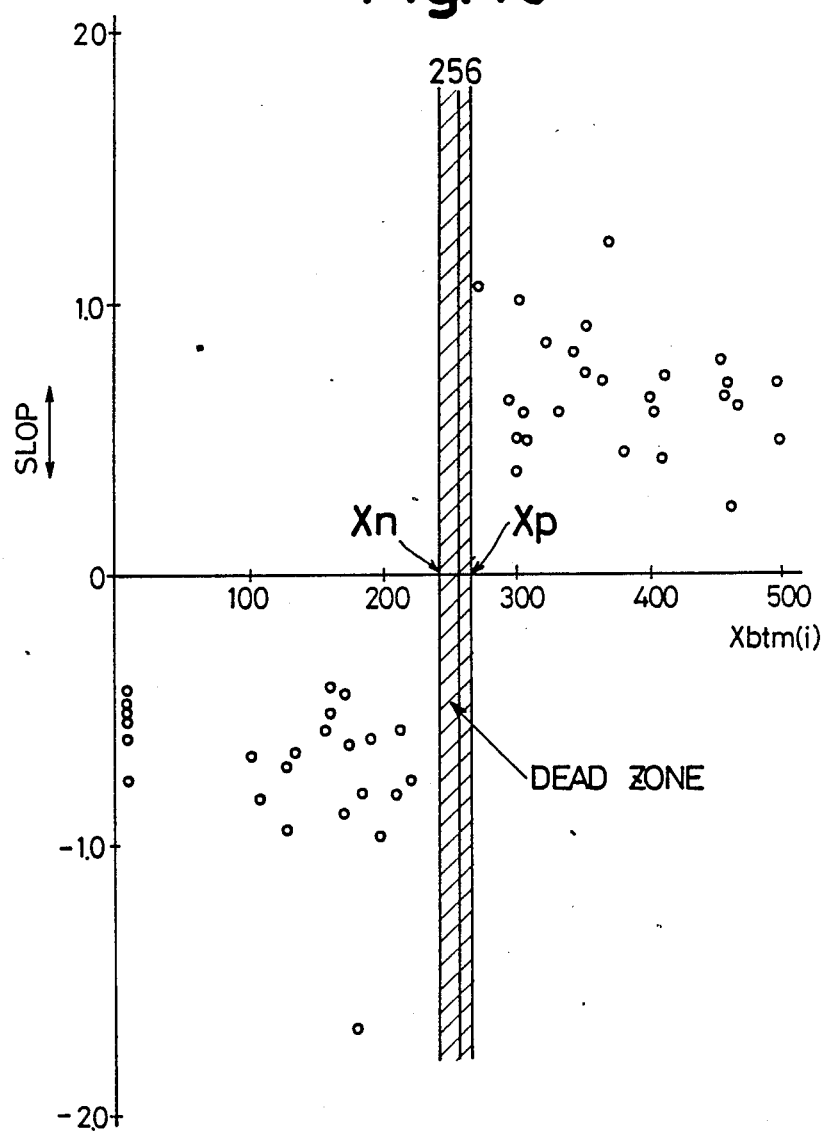

Next, refer to FIG. 10. This graph shows the inclinations of line segments with respect to the x-coordinate of the lowest image element of the ridge by actual measurement. In reference to the graph, it can be seen that with the center line $x=225$ of the original image area as a boundary, the inclination is positive when x-coordinate is larger than it, and the inclination is negative when the x-coordinate is smaller than it. It will be noted that the area in $x=Xn$ $Xp$ where reliability is low is set up as a dead zone.

In Steps 409 to 412 the study based on FIG. 10 was made. In other words, if the x-coordinate of the lowest image element of a ridge under study is larger than Xp, only the ridges that have positive inclination are adopted, and if smaller than Xn, only the ridges that have negative inclination are adopted. Ridges that were not adopted in this selection are omitted in Step 416.

For the ridges that were adopted in the study based on FIG. 10, further study about the length of the line segment is made in Steps 513 and 514.

Figure 11:
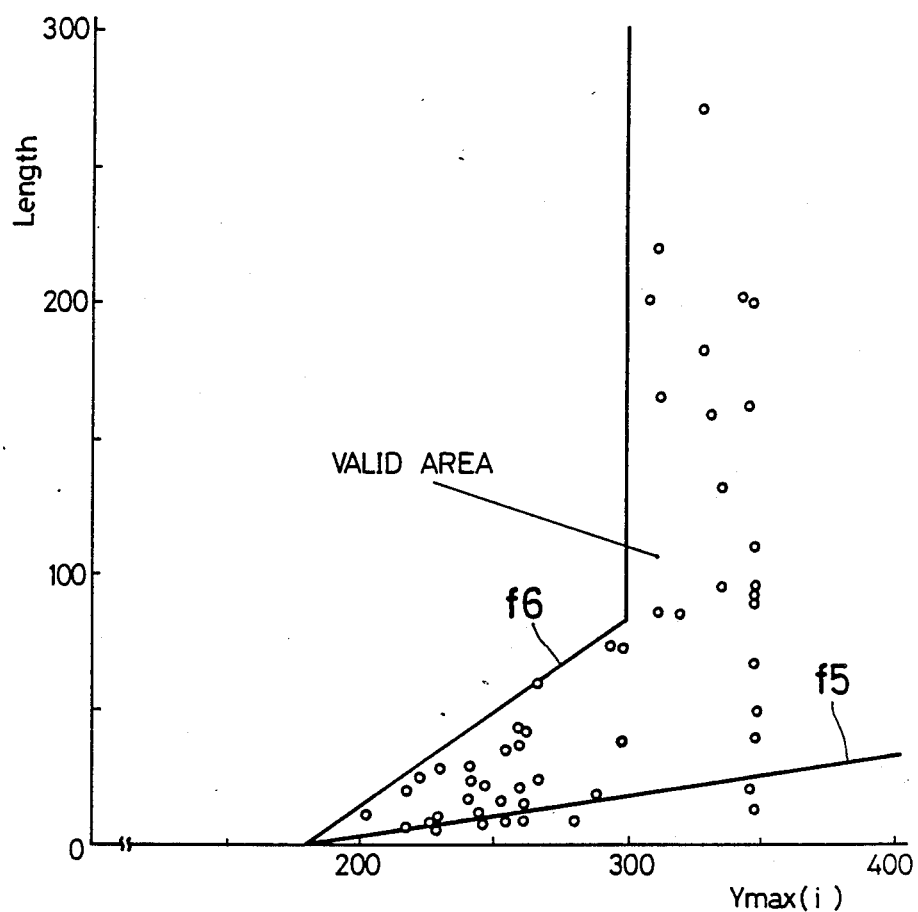

FIG. 11 is a graph based on actual measurement data of the distribution of the lengths (number of image elements) of ridges. In this embodiment of the invention, functions f5 and f6 were determined to limit the area which contains many white which were actually measured based on the graph.

In Step 413, the y-coordinate of the lowest image element of a ridge under study is substituted in the functions f5 and f6 respectively, and the values of the functions, A and B are loaded in the register, and in Step 414, the data on the number of image elements, G (i), is checked if it is in the range bounded by those values. If it is bound, the ridge under study is regarded as suitable for the detection of a perspective point, and in Step 415 1 is planted in the area i of the memory J, and re-registration is made, but if it is outside of the range, it is deleted in Step 416.

The above mentioned processes are made with incrementing the value of i by one increment successively. and the study is conducted for all of the ridges in the number of H (content of H memory) that are constituted with more than six (6) image elements.

In Step 419, the value of i is reset to 1.

In Step 420, the content of the memory J is examined. If it is 0, the value of i is incremented by one increment in Step 436 because in the processes of Steps 403 418 the ridge with the registration number of 1 is deleted, and the next ridge is studied.

In other words, if the content of the memory J (i) is 1, the ridge that is shown by the value of i at that time is a ridge that was re-registrated, and in this case in Step 421 the value of j is set to the value of i at that time, and in Step 422 the value of j is incremented by one increment.

In Step 423, the content of the memory J (j), that is, the data in the area that is shown by the value of j in the memory J at this time is examined. If it is 0, it is a ridge that was already omitted so that in Step 422 the value of j is further increased by one increment and a ridge that is re-registered is searched.

When a re-registered ridge is found, in Step 424 the product of the ridge inclination data (i) of the registration number j and the ridge inclination data I (i) of the ridge of the registration number j is taken, and in Step 425 it is judged whether the value of the product is positive or negative. If the value is negative, it means that two line segments of them are different, and in Step 422 the value of j is increased by one increment and next ridge is searched.

Figure 12:
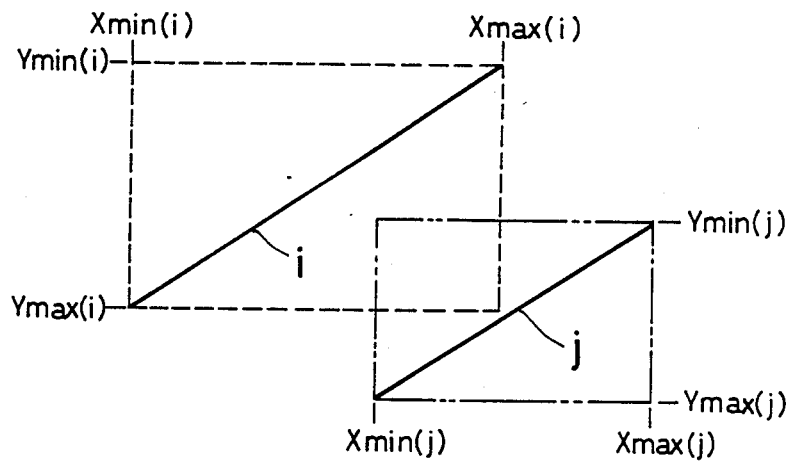
FIG. 12 is a drawing to explain the overlapping of line segments.

If the inclinations of the two line segments are equal, the product of respective inclinations becomes positive, so that in Steps 426 to 431 the overlapping of the line segments are detected. For this detection refer to FIG. 12.

In the embodiment of the invention, when the rectangular area (shown in dotted lines) which the ridge of the registration number 9 (it is shown as i in the figure) internally inscribes and a rectangular area (two-dot chain line) which the ridge of the registration number j (in figure shown by j) internally inscribes are overlapped those ridges are considered to overlap.

Actually, when between the x-coordinate Xmin (i) of the farthest left end image element and the x-coordinate Xmax (i) of the farthest right end image element of a ridge of registration number i there exists the x-coordinate Xmin (j) of the farthest left end image element or the x-coordinate Xmax (j) of the farthest right end image element of a ridge of the registration number j, and between the y-coordinate Ymin (i) of the highest end image element and the y-coordinate Ymax (i) of the lowest image element of a ridge of the registration number i there exists the y-coordinate Ymin (j) of the highest end image element or the y-coordinate Ymax (j) of the lowest end image element of a ridge of the registration number j, it is judged that there is an overlapping of ridges.

When there is an overlapping, in Step 432 the lengths of those two ridges, that is the content of the memory G (i) and the content of the memory G (j) are compared, and if the former is longer, then Step 433, J(i) is rewritten to 0, and the ridge with the registration number j is omitted, and if the latter is longer, then in Step 434, J(i) is rewritten to 0, and the ridge with the registration number i is omitted. In other words, if there is overlapping, the shorter ridge is merged into the longer ridge.

The above mentioned process is executed for all ridges that were re-registered in Steps 403-418, with the value of i successively increased by one increment in Step 406 and white line extraction is effected.

Figure 3E:
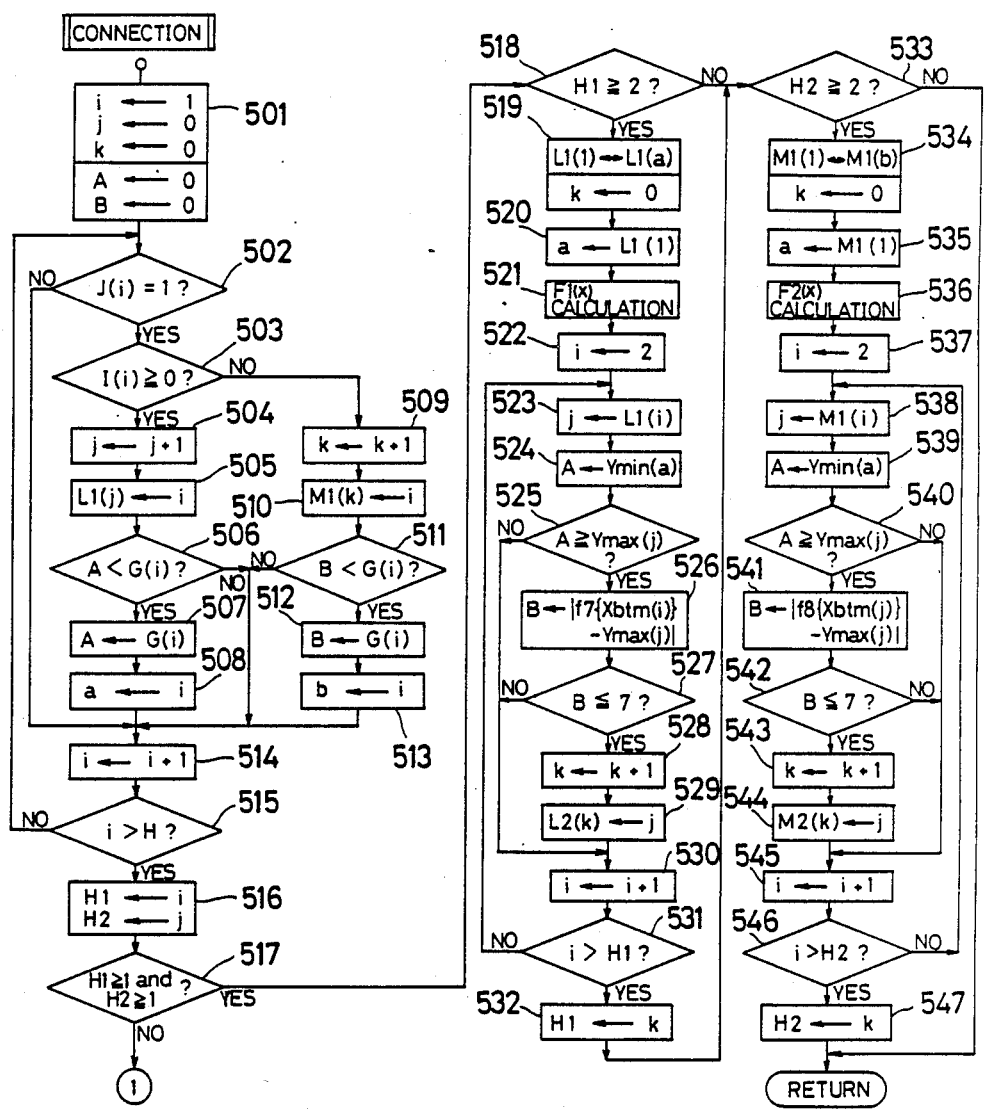

FIG. 3e is a flow chart which shows in detail the connection process in Step 8 of the flow chart shown in FIG. 2.

For this connection, first the value of i is set to 1 in Step 501, the values of j and k are set to 0, and the registers A and B are cleared to (0).

In the loop of Steps 502-515, longest line segments with positive inclination, and longest line segments with negative inclination are detected, and at the same time, a list of line segments which have positive inclination, and a list of line segments which have negative inclination are made.

In this process, the value of i corresponds to the registration number given to each ridge in the labelling process executed in Step 6 of the flow chart shown in FIG. 2, and the value of j corresponds to the address in the memory L1, and the value of k to the address in the memory M1.

In other words, when in Steps 502-505, the content of the memory J(i) is 1 (a ridge extracted in the white line extraction) and the content of the memory 1 (i) is positive (inclination positive), the value of i is increased by one increment, and the value (registration number of the ridge) of i is written in the area j of the memory L1, and if in Steps 502, 503, 509, and 510 the content of memory J (i) is 1 (a ridge extracted in the white line extraction) and the content of the memory I (i) is negative (inclination negative), the value of k is increased by one increment, and the value (registration number of the ridge) of i is written in the area k of the memory M1. As a result, when this loop process is finished, a list of line segments which have positive inclination is completed in the memory L1, and a list of line segments which have negative inclination is completed in the memory L1. The length of each list is shown by the value of j or the value of k when this loop is finished.

Further, in Steps 506-508, lengths of the ridges with positive inclination which were sorted in Steps 502 and 503 by using register A, that is, the corresponding contents of the memory G are successively compared, and every time a longer ridge is detected, the value of j at that time (address of the memory L1) is planted to a register, and in Steps 511-513, lengths of the ridges with negative inclination which were sorted in Steps 502 and 503 by using B register, that is, the corresponding contents of the memory G are successively compared, and every time a longer ridge is detected, the value of k at that time (address in the memory M1) is planted to the b register. Consequently, when this loop process is finished, the value of 'a' register becomes an address in the memory L1 to which the registration number of the longest ridge with positive inclination is planted, and the value of 'b' register becomes an address in the memory M1 to which the registration number of the longest ridge with negative inclination is planted.

In Step 516, the value of j, namely the length of the list made in the memory L1 for ridges with positive inclination is planted to the memory H1, and the value of k namely the length of the list made in the memory M1 for ridges with negative inclination is planted to the memory H2.

In Step 517, the length of each line is studied. In other words, if out of the contents of the memories in H1 and H2 at least one is 0, it is regarded as a mistake in the sampling. Then the process returns from Step 517 to Step 2 in the flow chart shown in FIG. 2 and it is restarted from reading images. If the length of each of those lists is over one (1), the process proceeds to Step 518.

If the content of the memory H1 is over two (2), that is, there are more than two ridges with positive inclination, the connection process of ridge with positive inclination is executed in Step 532, if the content of the memory H2 is over two (2), that is, there are more than two ridges with negative inclination, the connection process of ridges with negative inclination is executed in Steps 533-547. Because those two processes are similar, only the connection process of ridges with positive inclination will be explained.

In Step 519, the content of the memory L1 (1) and the content of the memory L1 (a) are exchanged, and the value of k is set to zero (0) in order to facilitate the following processes.

In Step 520 the content of L1 (1), that is the registration number of the longest ridge with positive inclination is loaded to the 'a' register because of the exchange made in Step 519.

In Step 521, a function f1 (x) for a straight line connecting the highest end image element of ridge and the lowest end image element of ridge in the registration number 'a' (content of 'a' register) is calculated.

In Step 522, the value of i is set to two (2).

In Sep 523, the content of L1 (i) is set to j, and in Steps 524, 525, 530, and 531, the y-coordinate Ymin (a) of the highest end image element of the ridge of the registration number 'a' and the y-coordinate Ymax (j) of the lowest end image element of the ridge of the registration number j are compared as the value of 'i' is successively renewed in order to search for a ridge which is located above the longest ridge with positive inclination.

If this ridge is found, the x-coordinate Xbtm (j) of the lowest end image element of the ridge is substituted in the function f1 (x) in Steps 526 and 527 to examine the deviation of the y-coordinate Ymax (j) of the lowest end image element of the ridge.

The aspect of the process at this time is shown in FIG. 13. As shown in FIG. 13, the value of the B register given in Step 526 is the distance in the direction of y-axis of the upward extension of the ridge (longest ridge) of the registration number 'a' from the lowest end image of the ridge of the registration number j.

If this deviation is smaller than seven (7) image elements (this number determined by experimentation), those elements are regarded as belonging to the same straight line, and they are consolidated and in Steps 528 and 529, the registration number of the consolidated ridges is written in the area k of the memory L2.

When the above mentioned process is finished for all ridges with positive inclination which are entered in the list of the memory L1, a list of the ridges with positive inclination which are consolidated to the longest ridge is completed in the memory L2, and the length of this list is shown by the value of k. Then the content of the memory H1 is corrected to this length of list in Step 532.

If in the same way as explained above the processes of Steps 533–547 are executed, a list of ridges with negative inclination which are consolidated to the longest ridge is completed in the memory M2, and the content of the memory H2 is corrected to the length of this list.

Figure 3F:
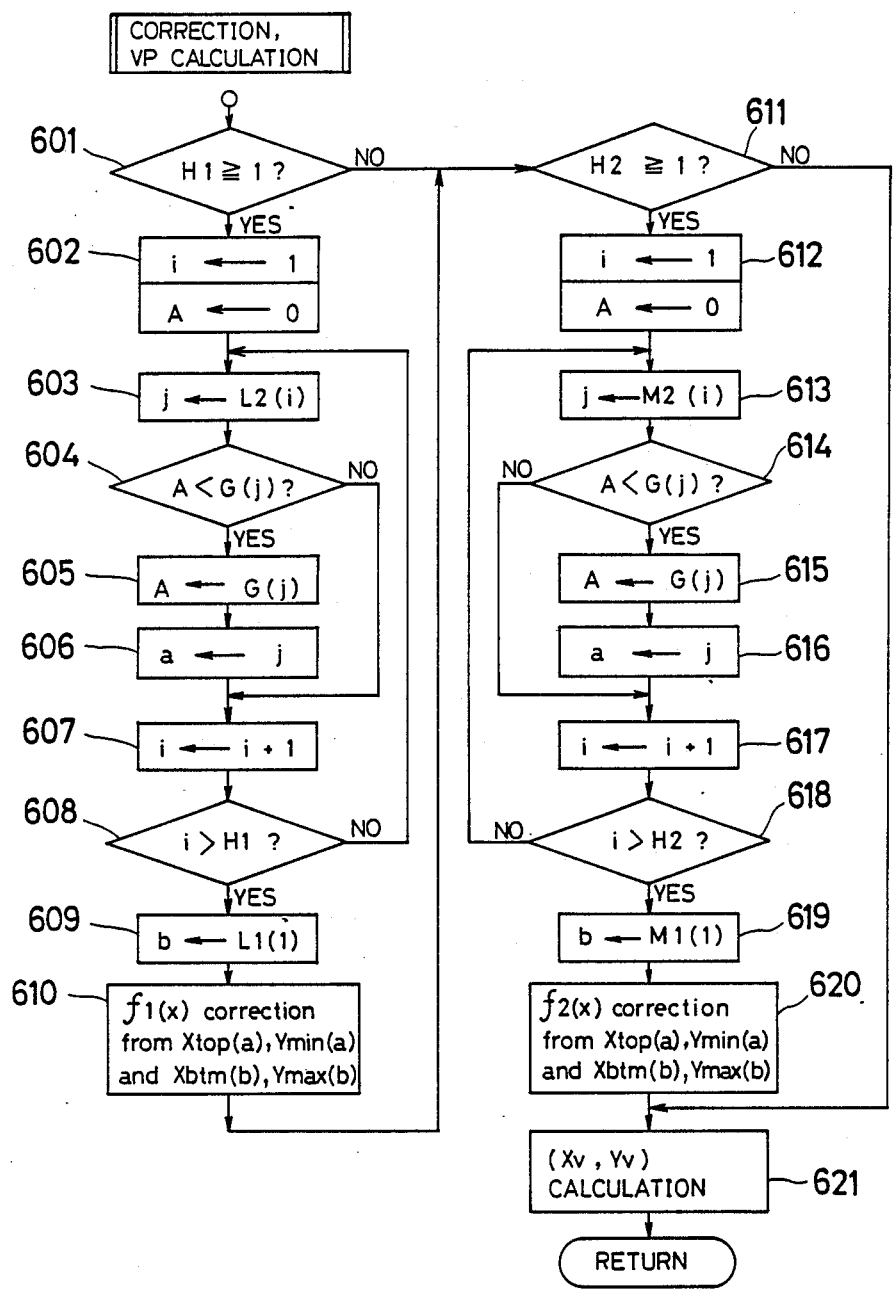

FIG. 3f is a flow chart describing in detail the correction process executed in Step 9 of FIG. 2, and the VP calculation process executed in Step 10 of the flow chart shown in FIG. 2.

In Steps 601–610, the function f1 (x) for a straight line with positive inclination is corrected in order to obtain a perspective point VP, and in Steps 611–620 the function f2 (x) for a straight line with negative inclination is corrected. Because those processes are similar, the former process will only be explained below.

In Step 601, the number of ridges with positive inclination which were detected in the above connection process and consolidated, that is, the content of the memory H1 is examined. If the number is 0, there is no need of correction so that the processes to follow are not executed and the process proceeds directly to Step 611, but if the number is 1 or over 1, the value of 'i' is set to 1 in Step 602 and the A register is cleared.

In Steps 603–608, referring to the list of the consolidated ridges with positive inclination which are written in the memory L2 as the value of 'i' is renewed, the registration number of the longest ridge is searched by successive comparison. When this is finished, the value of the 'a' register becomes the registration number of the longest consolidated ridge.

In Step 609, the content of the memory L1 (i), that is the registration number of the longest ridge with positive inclination is loaded to the 'b' register.

In Step 610, a function which connects the highest end image element of a ridge of the registration number a (Xtop (a), Ymin (a)), and the lowest end image element of a ridge with the registration number of b Xbtm (b), Ymax (b) is sought and the function f1(x) is corrected by it.

In Steps 611–620, the function f2 (x) is corrected in the same way as described above, and then in Step 621 an intersection point given by $f1(x) = f8(x)$. that is a perspective point VP is sought for its x-coordinate and y-coordinate (xv, yv).

In Step 11 of the flow chart shown in FIG. 2 from the x and y coordinates of the perspective point VP, the angle α which is made between the TV camera 6b and the horizontal line is calculated as explained above. For this process refer to the explanation above given.

Figure 3G:
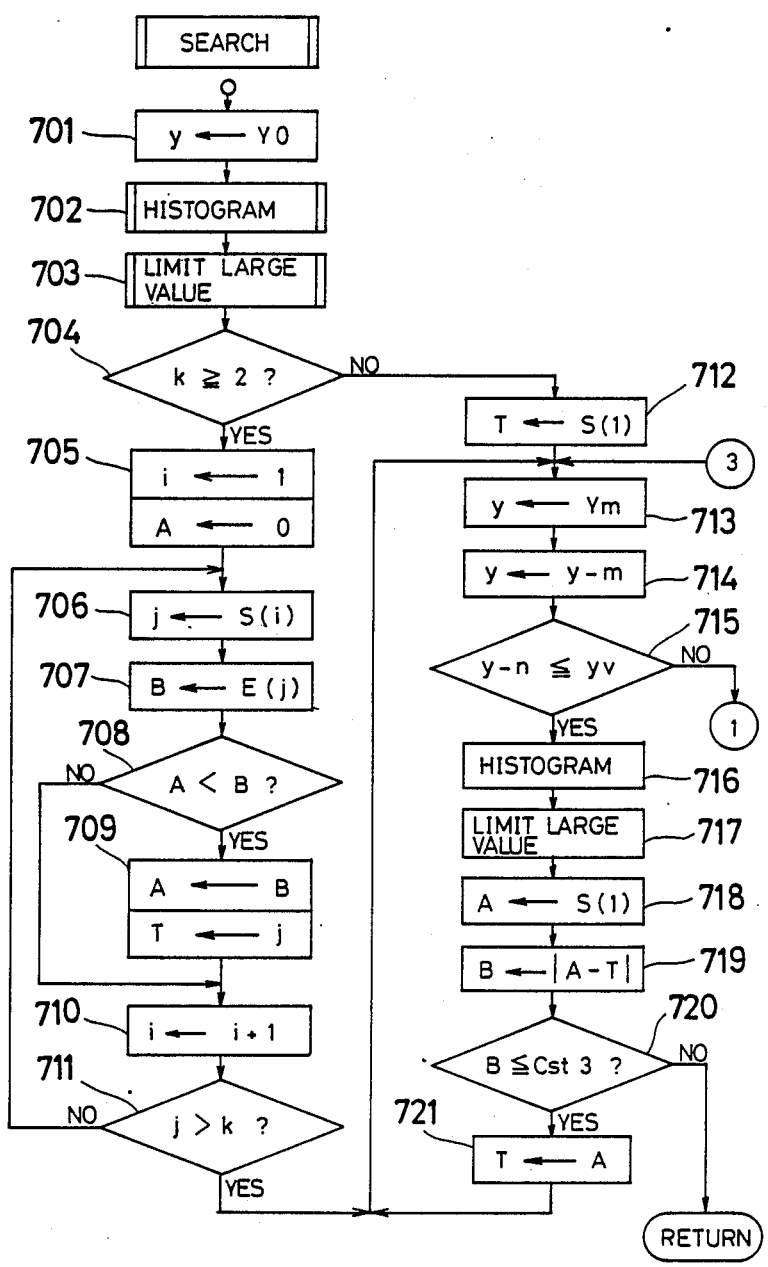

FIG. 3g shows the detail of the search process which is executed next.

In this process, first the y-coordinate is set to the value Y0 which corresponds to the edge of the bonnet, and in Step 702 the histogram making process is carried out.

Figure 14:
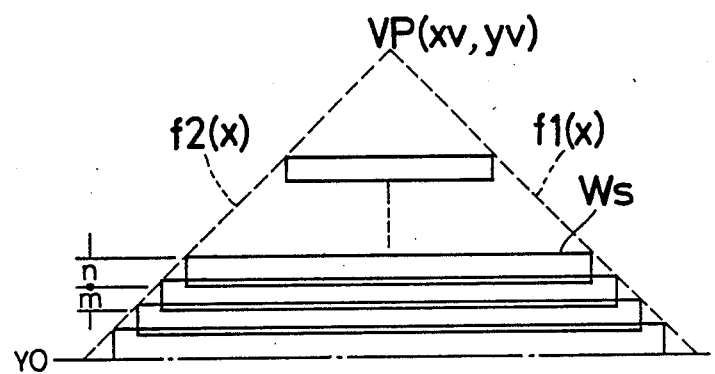
FIGS. 14, 15a, 15b, 15c, and 15d are drawings to explain the search process which the microcomputer shown in FIG. 1 performs.

The histogram making process is, as shown in FIG. 14, to set up a search window Ws which inscribes the supervision area AR bounded by the function f1 (x) and f2 (x) and y=Y0, and to seek the image element for each tone data of the image elements that are included in the search window Ws.

Figure 3H:
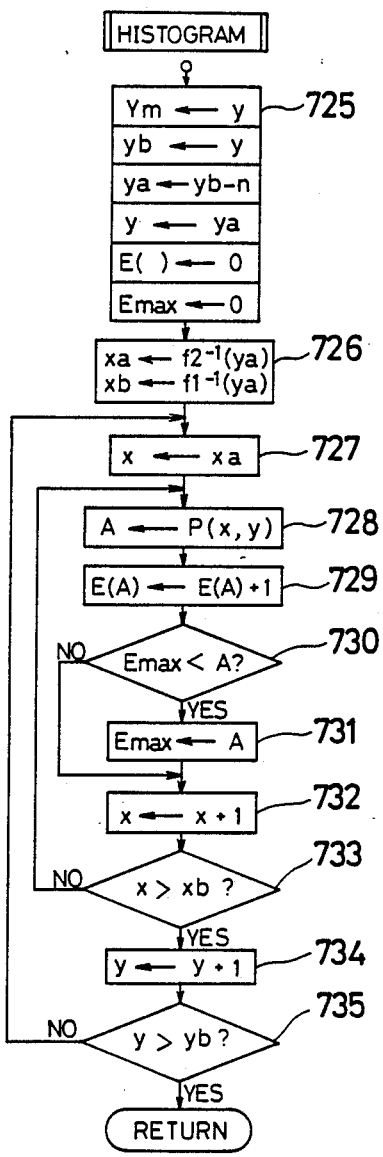

Referring to FIG. 3h, a flow chart of the histogram making process is shown.

In Step 725 of FIG. 3h, the y-coordinate at that time is evacuated to the memory Ym. Further, the Y-coordinate yb of the base of the search window Ws is set up, and the y-coordinate ya of the upper side which has a value smaller than yb by n (the number 15 for b is adopted in the embodiment) is set up, and the whole area of the memory E and the content of the memory Emax are cleared (0).

In Step 726, the x-coordinate of the point where the upper side touches the area AR is sought from the inverse functions of the functions f1 and f2, and respective x-coordinate xb of the right side and x-coordinate xa of the left side are set up.

In Steps 727–735, the number of image elements with the same tone and an image element with the highest tone are detected with the image elements in the search window Ws being scanned. In other words, in the luster-scanning the tone data P (x, y) of the coordinates (x, y) is loaded to the A register, and the content of the area A of the memory E is increased by one increment to make a histogram, and the largest tone data planted to the memory Emax and the value of the A register are compared, and if the latter is larger, the content of the memory Emax is renewed.

FIG. 3g is referred again.

Figure 3I:
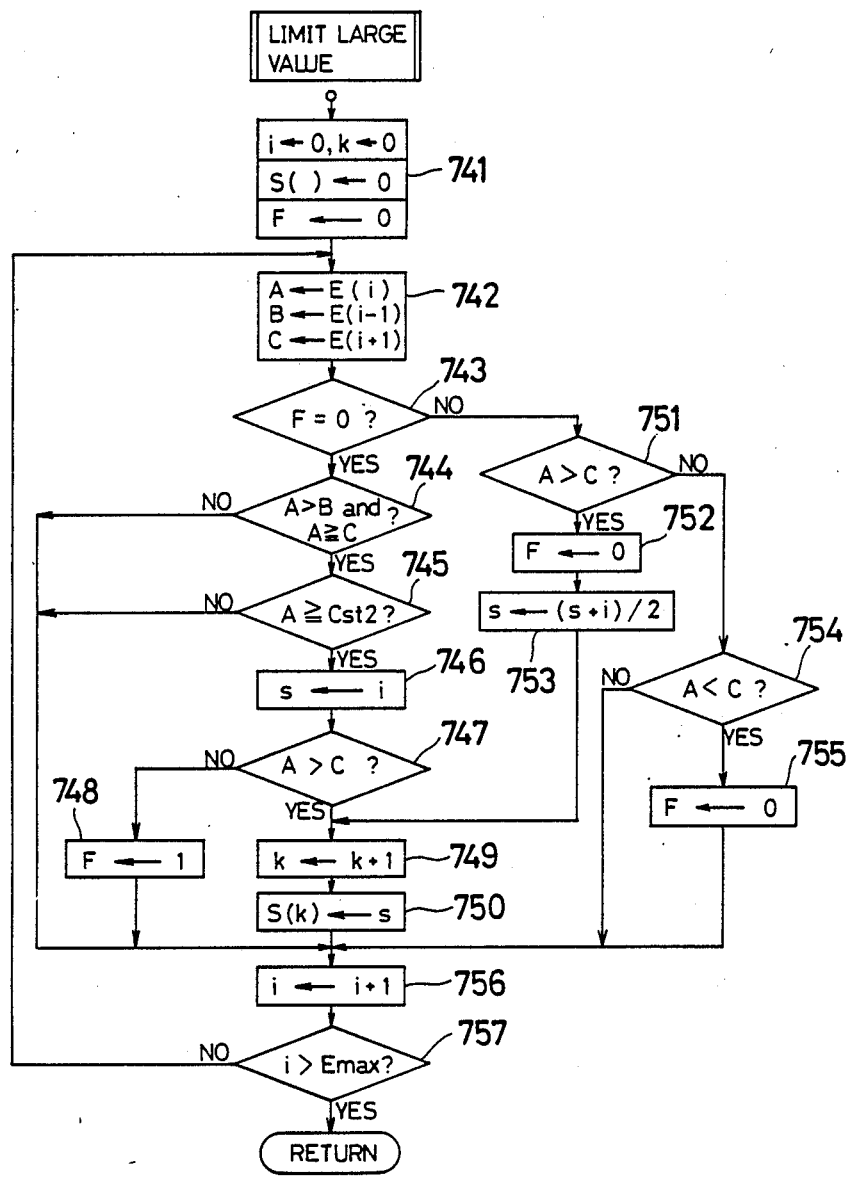

In Step 704, a process to seek the largest limit value in the histogram made in Step 702 is executed. This will be explained referring to the flow chart shown in FIG. 3i.

In Step 741, the values of i and k are reset to 0, and the whole area of the memory S is cleared (0) and the flag F is reset (0).

In Step 742, the number of image element data E(i) which corresponds to the tone data i is loaded to the A register, number of image element data E (i−1) which corresponds to the tone data E (i+1) which corresponds to the tone data i+1 to the C register, providing that if i=0, 0 is loaded to the B register.

When flag F is reset (0), the values of the A register and B register, and the values of the A register and C register are compared in Step 744.

If the value of the A register is larger than the value of the B register, and the value of the A register is larger than or equal to the value of the C register, the value of the A register is considered to be one of maximum values in the histogram. In this case the value of the A register is compared with a constant Cst2 to remove noise in Step 745, and if it is larger than the constant, the value of tone data by which the value of i, namely the value of the A register was given is loaded to the s register.

In Step 747, the value of the A register and the value of the C register are further compared, and if the value of the A register is equal to the value of the C register, then the flag F is set to (1) in Step 748 because the maximum value should be examined by changing the value of i, but if the value is not equal to the value of the C register, the value of the A register is judged to be the maximum value, and the value of k is increased by one increment and the value of the A register, namely the tone data to obtain the maximum value is registered to the are k of the memory S.

After this, the value of i is increased by one increment in Step 756, and the process returns to Step 742 and the next maximum value is searched.

In Step 748 if the flag F is set, the value of i is increased by one increment in Step 756 and the process returns to Step 742, but from Step 743 the process then proceeds to Step 751.

At this time, if the value of the A register is equal to the value of the C register, the value of i is further renewed and examination continues.

If the maximum value portion of the histogram is flat, the above examination continues and at the same time the value of the A register becomes larger than the value of the C register. In this case, the flag F is reset in Step 752, and in Step 753 the central tone of the flat portion, that is the tone data at the place where the flat portion which is the value of the s register and the value of i at that time, that is the tone data when the flat portion ends are averaged, and the average is loaded to the s register. After this, the process proceeds from Step 749 to Step 750, and as stated above, the value of the register is registered.

Incidentally, if at the end of the flat portion of the histogram the gone again increases, the value of the C register is larger than the value of the A register. In this case, the process proceeds from Step 754 to Step 755, and the flat F is reset (0) and the search of the maximum value continues.

In the process of making histograms, the maximum tone data in the search window is planted to the memory Emax so that the process to obtain the maximum value should be ended at reaching the tone which is equal to the content of the memory Emax.

When this process is finished, in the memory S a list of tone data to obtain the maximum value, and the length of the list is shown in the value of k.

FIG. 3g is referred to again.

As explained in the proceeding description, because the value of k is the length of the list of tone data to obtain the maximum value and made in the memory S, if this value is over two (2), the process proceeds from Step 704 to Step 705.

In Steps 705–711, of the maximum value of the histogram made in Step 702 from the list made in the memory S, the tone data to obtain the largest is planted to the memory T. In other words, every time the value of i is changed to $1-k$, the tone data S(i) to obtain the maximum value of the registered number i is read and set to j, and the image element number data E (j) that corresponds to the tone data (j), and the value of the A register are compared. When the image element number data E (j) is larger, the value of the A register is renewed, and the tone data j at that time is planted to the memory T. When this process is finished, the value of the A register shows the number of the image element that is the maximum limit value, and the content of the memory T is the tone data to obtain it.

Further, if the histogram made from Step 702 has only one limit value, the process proceeds from Step 704 to Step 712, and the tone data S (1) to obtain the limit value is planted to the memory T.

As a result, the content of the memory T shows the tone that represents the image element corresponding to the read surface.

In Step 713, the y-coordinate of the base in the search window which is set when it is evacuated to the memory Ym is read and the y-coordinate is set.

In Step 714, the coordinate of y is renewed by m that is small, and in Step 715, it is examined to determine whether the search window set up by making the y-coordinate the base at that time falls in the supervision area AR. If the process fails to make the search window fall in the area, it returns to Step 2 in the flow chart shown in FIG. 2 and is restarted from reading images.

When it is possible to set the next search window in the supervision are AR, the histogram making process which is the same as described above for the search window set up by making the Y-coordinate the base at that time, and in Step 717 and in Step 717, the process that is the same as explained above is executed to obtain the limit value in the histogram which was made.

By the way, in this embodiment of the invention, the renewal distance of the y-coordinates is ten (10) and the height of the search window is fifteen (15), so that each search window has a portion that is overlapped by the next one in the direction of y-axis by five (5) (see FIG. 14).

In Step 718, out of the histograms made in Step 716, the tone data of the peak (limit large section) which appears in the side where the tone is the lowest, that is, the tone data planted to S (1) is read and loaded to the A register.

In Steps 719 and 720, the difference of its tone data and the content of the memory T, in this case the tone data which obtained the largest limit value in the histogram about the first search window is compared with a constant value Cst 3. If this difference is lower than Cst 3, the content of the memory T is renewed to the value of the A register and the process returns to Step 713 and the above processes are repeated, but when Cst 3 is exceeded, the process ends.

The above mentioned processes are summarized below in reference to FIG. 15a–FIG. 15d.

Figure 15A:
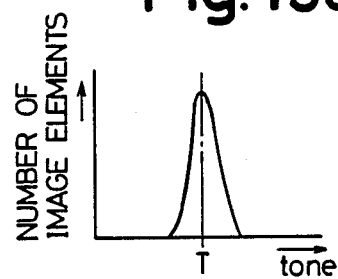

FIG. 15a shows that only one limit large value exists in the tone histogram in the search window that was first set up, and the central tone data (in Figure shown by T) is planted to the memory T as judgment data for the next search window.

Figure 15B:
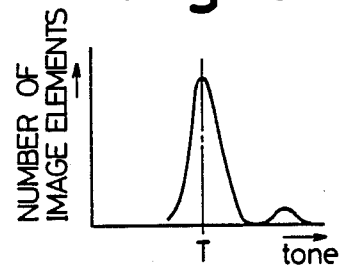

FIG. 15b shows the tone histogram in the next search window. If the central tone of the peak that appears here first is substantially the same as the content of the memory T, the content of the memory T is renewed by that tone data. In other words, in this case, a peak with tone higher than the tone data T appears in the histogram, but it is neglected as one that reflects the white lines, etc.

Figure 15C:
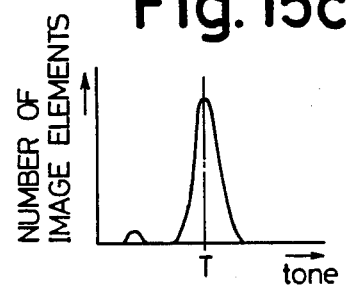
Figure 15D:
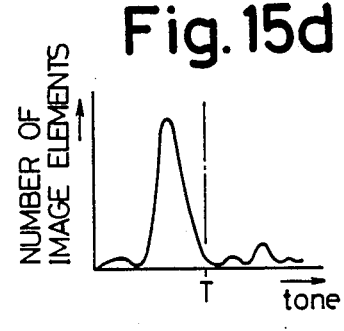

FIG. 15c and FIG. 15d show other tone histograms of different search windows. Here a peak that has a tone which is lower than the content of the memory T appears. In such a case, there is a high possibility that there is a vehicle in front and the search process is finished.

Figure 3J:
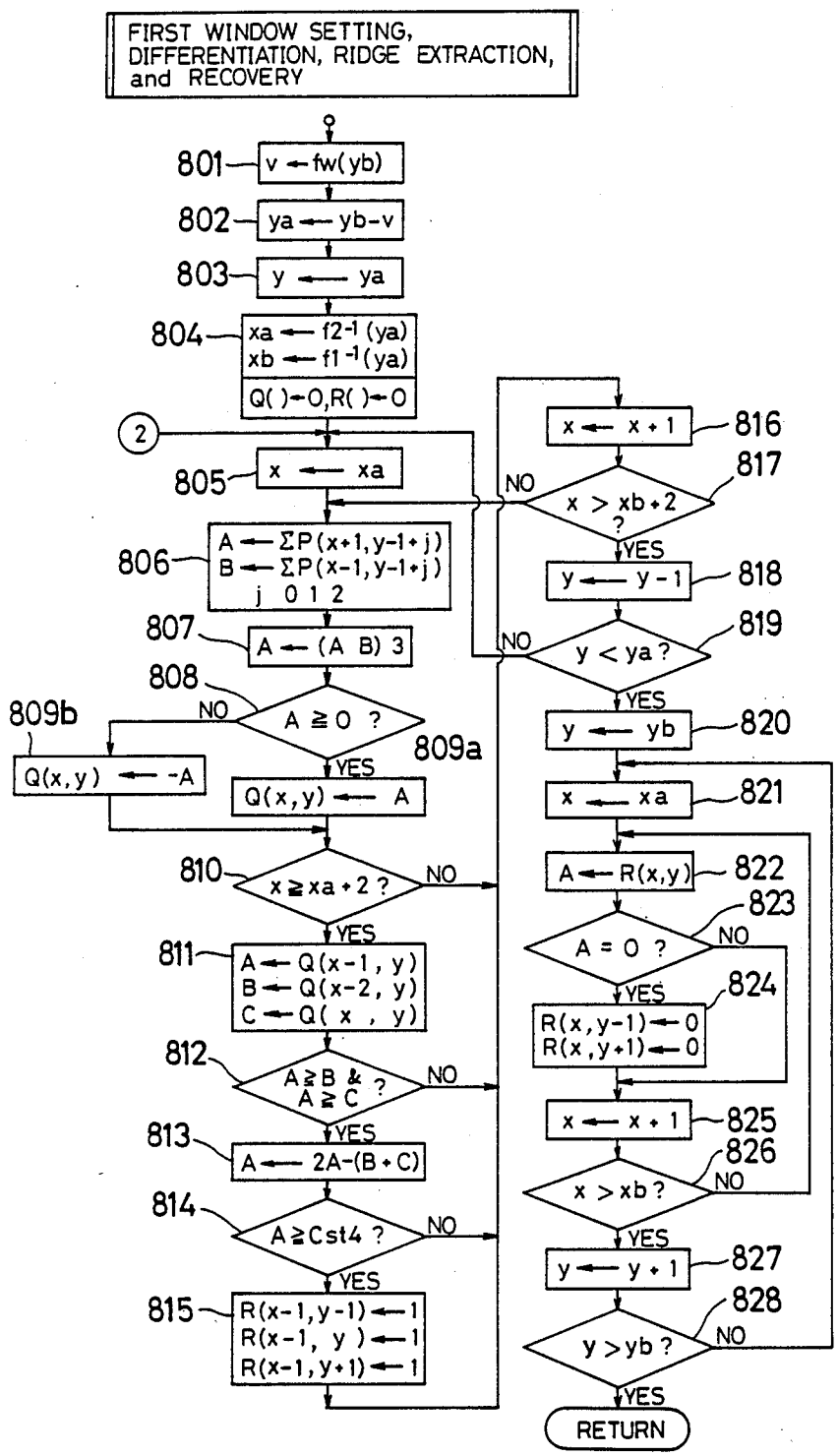

In FIG. 3j, the first window setting process in Step 13, horizontal differential process in Step 14, ridge extraction process in Step 15 and recovery process in Step 16 of the flow chart in FIG. 2 are shown in detail.

In Step 801, the y-coordinate yb of the base of the search window when the search process is finished is substituted in a function fw (yb) which was set up beforehand to obtain the height v of the first window. In Step 802, the y-coordinate ya of the upside of the first window W1 is set by this height, and in Step 803, the value of y is set by the y-coordinate of the upside.

In Step 804, from the inverse function of an approximation function for the left side white line which defines the supervision area AR and from the inverse function of an approximation function for the right side white line, the x-coordinates xa and xb of the left and right sides of the first window W1 are sought and the whole areas of the memories Q and R are cleared (0).

In Steps 805–819, the horizontal differentiation process in Steps 806–809, and the ridge extraction and expansion processes in Steps 811–815 are conducted with the inside of the first window being luster-scanned.

In Steps 806 and 807, attention is paid to the coordinates (x, y) image element, and from the sum of tone data of the image element upper right to the image element in attention, image element next to it to the right, and the image element lower right to it, the sum of the tone data of the image element upper left to the image element in attention, image element left to it and image element lower left to it is subtracted and divided by 3 to average them.

Here the absolute value of this average is made a differentiation tone data, and it is written in the area (x, y) of the memory Q in Step 809a or 809b. In the case in which the ridge extraction process is carried out horizontally (by a horizontal process to extract a ridge which extends almost vertically), the differential tone data of the image elements right and left to the image element in attention is necessary. In other words, it is possible to extract ridge with attention paid to the image element that is one element nearer, if the x-coordinate is more than xa+2.

In Step 810, if this condition is met, then in Step 811 the differential tone data Q (x−1,y) of the image element in attention is loaded to the A register, the differential tone data Q (x−2,y) of image element left to the image element in attention is loaded to the B register, and the differential tone data of the image element right to it, Q (x,y) is loaded to the C register. If among those differential tone data, the relations: $A \geq B$, $A \geq C$, and $2A-(B+C) \geq Cst \, 4$ (given constant), it is assumed that ridge is extracted, and it is expanded vertically up-and-down and "1:there is a ridge" is planted to memory areas of the memory R, (x−1, y−1), (x−1,y) and (x−1, y+1).

When the above horizontal differential process, ridge extract process and expansion process are finished for all image elements in the first window W1, data that shows a ridge vertically expanded in the first window is planted to the memory R. Then, in Steps 820–828, a ridge after expansion is shrinked by the size of one image element in the vertical direction. In other words, every time "0" is detected in Steps 823 and 824, with the area of the memory R which corresponds to the first window W1 being luster-scanned, "0" is planted to its upper and lower areas.

In Step 17 of the flow chart of FIG. 2, the labelling process shown in FIG. 3c is made by specifying Xs to xa, Ys to ya, Xe to xb, Ye to yb and V1 to the value of about 10% of the height v of the first window. With this process, ridges that are distributed in the first window, as shown in FIG. 16a, are registered.

For the detail of the labelling process refer t the explanation of the labelling given above.

Figure 3K:
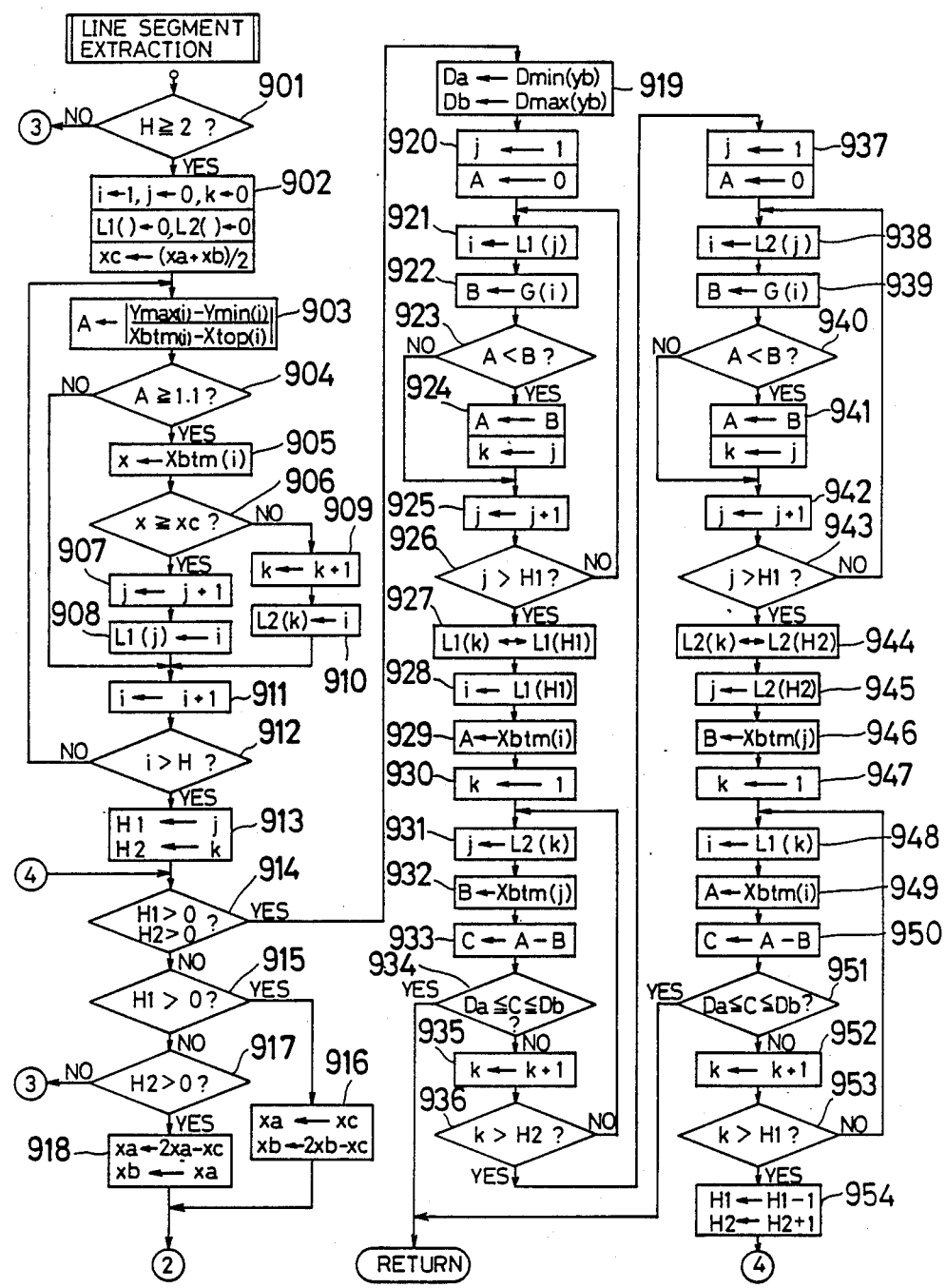
Figure 3L:
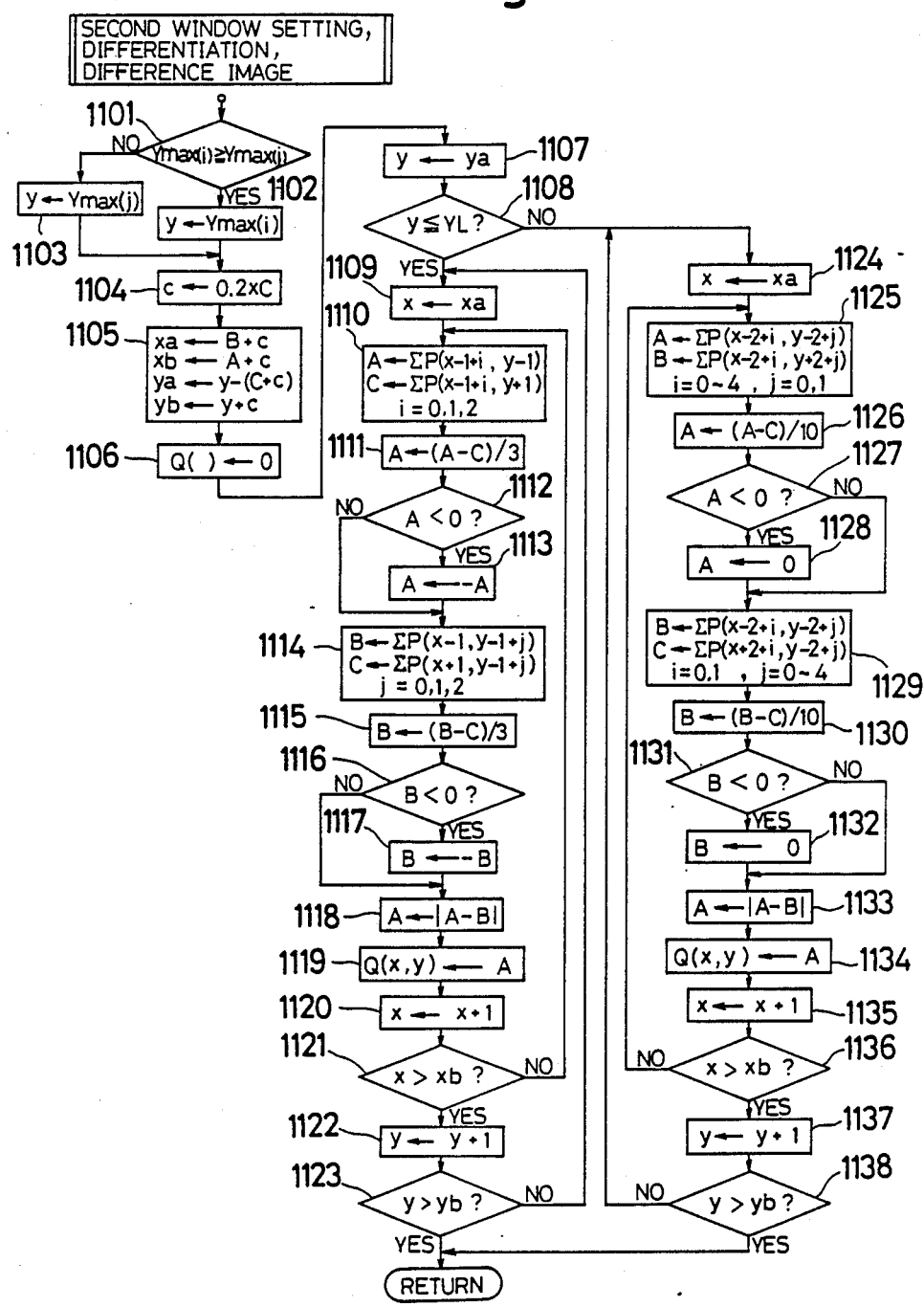

The detail of the extraction process for the right and left line segments executed in Step 18 will be explained with reference to the flow chart of FIG. 3k.

In this flow chart, if the number of the ridges (hereinafter called first registration ridge) that were registered in the labelling process in Step 17 (FIG. 2) is smaller than 1, it is regarded as mistake in the sampling, and the process returns to Step 713 of the search process (FIG. 3g) that was described before, and the search window is renewed and set up. The above number is the content of the memory H.

In Step 902, the values of i, j, and k are reset to 0, whole areas of L1 and L2 are cleared (0), and the x-coordinate of the middle line of the first window W1 is set to xc (see FIG. 16a).

In Steps 903 and 904, out of first registered ridges those with inclination over 1.1 (obtained by experiment) are sorted out. In other words, in Step 904, for each image element in the inclination of a line segment which connects the highest image element and lowest image element is sought, and in Step 904 its inclination is compared with 1.1.

In Steps 905 and 906 the x-coordinate Xbtm (i) of the lowest image element for each ridge, and the x-coordinate, xc of the middle line of the first window W1 are compared, and ridges are classified in those (called hereinafter right side ridges) which belong to the right area (right side area after division by middle line) and those (called hereinafter left side ridges) which belong to the left are a (left side area after division by middle line).

In Steps 907 and 908, the registration numbers of the right side ridges are planted to the area (u) of the memory L1, and in Steps 909 and 910, the registration number of the left side ridges are planted to the area (k) of the memory L2.

When the process from Steps 903 to 910 is applied to all of the first registration ridges, a list of the right side ridges which have inclination over 1.1, and which belong to the right side is made in the memory L1, and a list of the left side ridges which have inclination over 1.1, and to belong to the left side is made in the memory L2, and since their respective lengths are shown by the values of j, and k, in Step 913, the value of j is planted to the memory H1, and the value of the k are planted to the memory H2.

If the content of the memory H1 and H2 are both over 1, the process goes direct to Step 919, and those that follow, but if only the latter is 0, a vehicle in front is considered to be running along the right side, and in Step 916 the first window is shifted to the right by a half of its total width to be reset, and after this the process returns to Step 805 in FIG. 3j, and if only the former memory H1 is 0, the vehicle in front is considered to be running along the left side, and the first window is shifted to the left by a half of its width in Step 918 to be reset, and the process returns to Step 805 of FIG. 3j. If both are 0, it is considered to be a mistake in sampling, and the process returns to the search process (FIG. 3g) from Step 917, and the search window is renewed and set up.

In Step 919, the minimum vehicle width data, Dmin for a minimum vehicle width which can be regarded as a vehicle in front is set to the Da register, and the maximum vehicle width data, Dmax, is set to the Db register. Because those vehicle width data are different with regard to the y-coordinate, they are read by the y-coordinate, yb of the base of the first window from a table prepared beforehand.

Steps 920–926 is a loop to search for a longest ridge by successively comparing the lengths of first registration ridges in the list of right side ridges. The search process for a maximum value of this kind has been explained above so that it will not be explained here.

The right side longest ridge becomes a candidate (hereinafter called right side candidate ridge) for a ridge which indicates the right side edge of the front vehicle.

The value of k when this loop is finished becomes the address of the memory L1 to which the registration number of the longest ridge on the right side is planted. Here, in Step 927 the content (registration number of longest ridge) of the area k of the memory L1, and the content of the area H1 (area at the tail end) are exchanged.

In Steps 928 and 929, the registration number of the right side candidate ridge is read, and its lowest end image element is loaded to the A register.

After the value of k is set to one (1) in Step 930, the x-coordinate of the lowest end image element of the k-th registration ridge in the list of left side ridges is loaded to the B register in Steps 931 and 932, and in Steps 933 and 934, the difference of the value of the A register and the value of the B register, namely the distance to the right side candidate ridge is sought, and it is examined to determine whether or note the distance is in the range limited by the vehicle width data Da and Db.

If this distance is outside of the range, the value of k is renewed in Step 935, and the process returns to Step 931.

If a left side ridge which has its distance from the right side candidate ridge in the range limited by vehicle width data is found, it is taken as a ridge (hereinafter called left side candidate ridge) which is a candidate for showing the left side edge of a vehicle in front, and the process is finished in Step 934, but if there is no candidate in the list of left side ridges, the reposes from Step 937 is executed.

Steps 937–953 is a process to search for a right side ridge, the distance of which from the left side longest ridge taken as the left side candidate ridge is in the range limited by vehicle width, and because this is similar to the process of Steps 920–936, its explanation is omitted.

If in the process of Steps 937–953 the right side candidate ridge is not found, the contents of the memories H1 and H2 are respectively decreased by one decrement and the process returns to Step 914. With this, the second length right side ridge or left side ridge becomes the right side candidate ridge or left side candidate ridge and the above process is repeated.

The value of i when the right and left line segment extraction process if finished is the registration number of the right side candidate ridge, the value of j is the registration number of the left side candidate ridge, the value of the A register is the x-coordinate of the lowest end image element of the right side candidate ridge, the value of the B register is the x-coordinate of the lowest end image element of the left side candidate ridge, and the value of the C register is the distance between the right side candidate ridge and the left side candidate ridge.

The second window setting process executed in Step 19 and vertical and horizontal differential processes executed in Step 20, difference image making process executed in Step 20 of the flow chart in FIG. 2 will be explained in reference to the flow chart shown in FIG. 31.

In Step 1101, the y-coordinate, Ymax (i) of the lowest end image element of the right side candidate ridge, and the y-coordinate, Ymax (j) of the lowest end image element of the left side candidate ridge are compared. If the former is larger or both are equal, the value of y is set to the former in Step 1102, and if the latter is larger, the value of y is set to the latter in Step 1103.

In Step 1104, the value of the C register, namely 20% of the distance between the right side candidate ridge and left side candidate ridge is set to the C register.

In Step 1105, the value of xa is set to the value of the B register, that is, the coordinate which is on the left side from the x-coordinate of the lowest end image element of the left side candidate ridge by the value of the c register, and the value of xb is set to the value of the A register, that is, the coordinate which is on the right side form the x coordinate of the lowest end image element of the right side candidate ridge by the value of the C register, and the value of ya is set to the coordinates which are on the upper side from the value of y set in Step 1104 by the value of the C register plus the value of the c register, and the value of yb is set to the coordinates which are below the value of y by the value of the c register that set up the second window W2 shown by diagonal coordinates (sz, ya) and (sb, yb) as shown in FIG. 16b.

Two line segments in the second window W2 shown in FIG. 16b show respectively the right side candidate ridge and the left side candidate ridge, and here the distance between them is shown by two.

In Step 1106, the whole area of the memory Q is cleared (0), and in Step 1107 the value of y is set to ya.

In Step 1108, the y-coordinate to start the process, that is, the y-coordinate, ya of the upper side of the second window W2 and the short distance limit $Y_L$ are compared.

In this comparison, if the y-coordinate is smaller than the short distance limit $Y_L$ (including the case of equality), that is, the spatial tone variation is comparatively rapid for an image in the far away so that vertical and horizontal differentiation using the $3 \times 3$ image element matrix in Step 1109 and the processes to follow are executed, and in this case when the y-coordinate is larger than the short distanced limit $Y_L$, that is, when the second window W2 is set for near images, the spatial variation in the tone is relatively small so that the process below Step 1124 which executes vertical and horizontal differentiation using $5 \times 5$ image element matrix is carried out.

In Steps 1110–1113, vertical differentiation is made with attention paid to the image element at (x,y) coordinates. The vertical differentiation is to subtract the sum of the tone data of the three image elements under the image element in attention from the sum of the tone data of the three image elements that are on the upper side of the image element in attention in the 3×3 image element matrix and the to divide the difference by three (3). If the result is negative, it is corrected to positive data.

In Steps 1110–1113 horizontal differentiation is carried out with attention paid to the image element at the coordinates (x, y). This horizontal differentiation is, as explained above, to subtract the sum of the tone data of the three image elements that are on the right side of the image element in attention from the sum of the tone data of the three image elements that are on the left side of the image element in attention in the 3×3 image element matrix, and to divide the difference by 3. If the result is negative, it is corrected to positive data.

In Steps 1118 and 1119, the difference (absolute value) of the vertical differential tone data and the horizontal differential tone data are planted to the area (x,y) of the memory Q which corresponds to the image element in attention.

If the above mentioned processes are made for all image element in the second window W2 with the method for luster-scanning, the data that corresponds to the difference image of the vertical differential image and the horizontal differential image in the second window W2 is written in the memory Q. Because the processes in Steps 1124–1138 are the same as the above processes in Steps 1109–1113 except that the size of the matrix is different, their explanation is omitted.

Figure 3M:
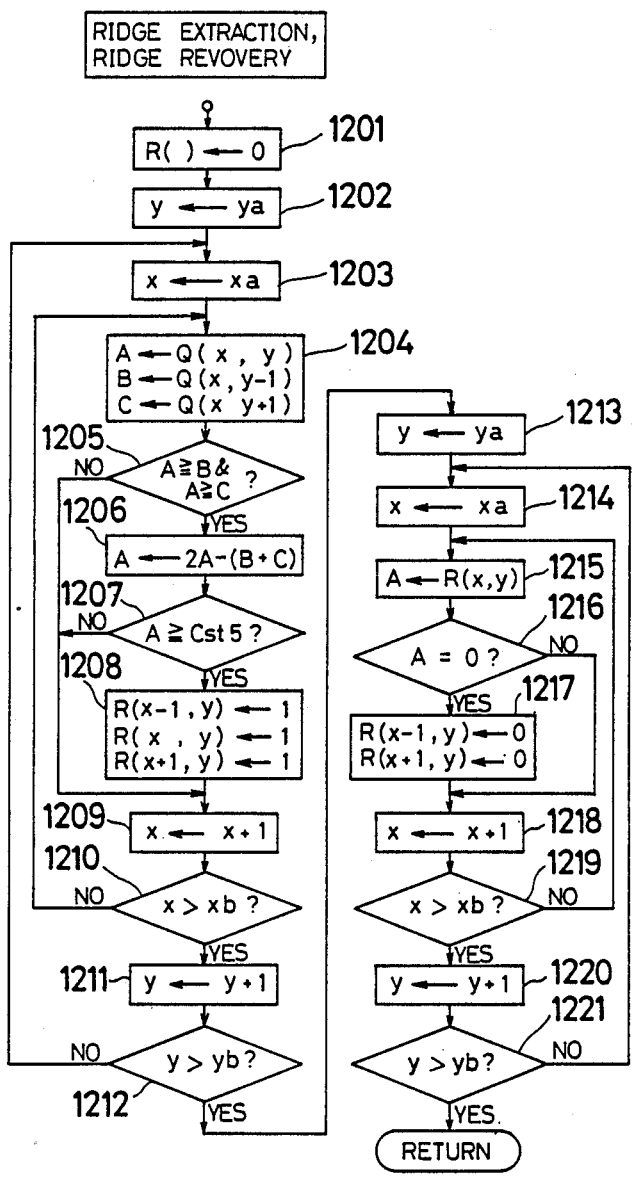

FIG. 3m is a flow chart which shows in detail the ridge extraction process executed in Step 22 and the recovery process executed in Step 23 in the flow chart of FIG. 2.

In Step 1201, the whole area of the memory R is cleared (0). In the memory R, the ridge data is written in the following processes.

In Steps 1201–1212, the vertical ridge extraction process (by vertical extraction ridges which extend substantially horizontally are extracted) and expansion process are executed with the difference image data being luster-scanned.

In the ridge extraction process, because the image element in attention and adjacent image elements that are on or under the image element in attention are used, the difference image data Q (x,y) of the image element in attention is loaded to the A register, and the difference image data Q (x,y−1) right on the image element in attention to the B register, and the difference image data Q (x, y+1) of the image element right under the image element in attention to the C register in Step 1204.

In Steps 1205–1208, if among the difference image data that were set to the registers A, B, and C, a relation, $A \geq B$, $A \geq C$ and $2A - (B+C) \geq Cst\ 5$ (specified number) is established, it is judged that a ridge is extracted and "1: there is a ridge" is written in the area (x,y) that corresponds to the image element in attention in the memory R and at the same time "1: there is a ridge" is written in the area (x−1, y) and area (x+1, y) in order to expand the area (x,y) by one image element space.

When the above mentioned vertical ridge extraction process and expansion process are finished for all image elements in the second window W2, the ridge data planted to the area of the memory R which corresponds to the second window W2 is luster-scanned to give a shrinkage process in Step 1213 and the processes to follow it.

In the shrinkage process, the ridge data corresponding to the image element in attention is read in Step 1215 and examined in Step 1216, and if it is "0", then "0" is planted in Step 1217 to the area of the memory R which corresponds to the image element left to the image element in attention.

In Step 24 of the flow chart shown in FIG. 2, Xs is specified to xa, Ys to ya, Xe to xb, Ye to yb and V1 to the value about 30% of the width of the second window W2 to carry out the labelling process shown in FIG. 3c. When this process is finished, a ridge consisting of image elements which are distributed in the second window W2 and extend substantially horizontally is registered as shown in FIG. 17b. For details of the labelling process refer to the above explanation.

Figure 3N:
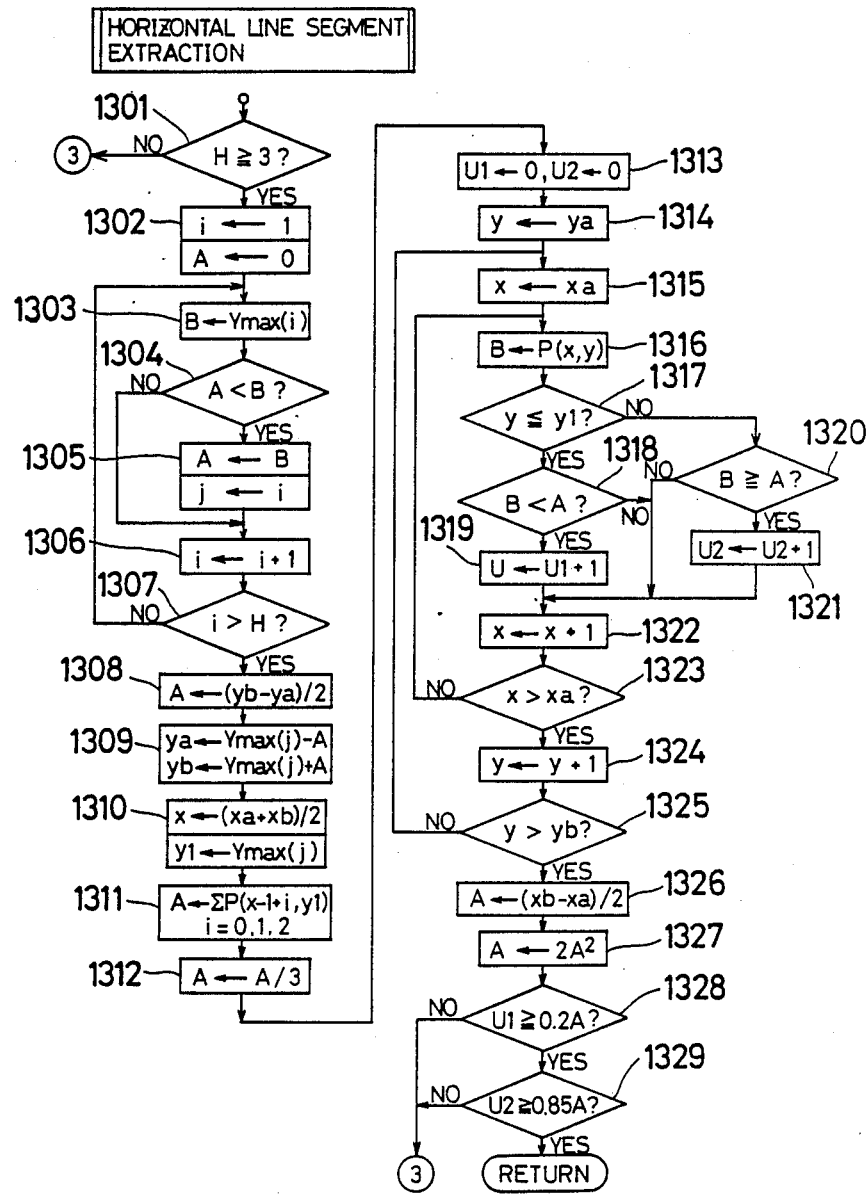

Now the detail of horizontal line segment extraction process which is executed in the flow chart of FIG. 2 will be explained in reference to FIG. 3n.

In this extraction, if the number (content of the memory H) of ridges registered in the labelling process which was done in Step 24 (FIG. 2) is under 2, it is regarded as a mistake in sampling, and the process returns to Step 713 of the search process (FIG. 3g) above mentioned from Step 1301 and the search window is renewed and set up.

Steps 1302–1307 is a loop to search the registration number of the second registration ridge which has the lowest end image element which is most downwards (y-coordinate largest) with the y-coordinates of the lowest end image element of the second registration ridge being successively compared, and the registration number which is sought is the value of j when this loop is finished. Processes of this kind have been explained several times, and now the explanation is omitted.

In Step 1308, the height which is half the height of the second window W2, (yb−ya)/2 is sought, and the height thus sought is set to the A register, and in Step 1309 Ymax(j), namely from the Y-coordinate of the lowest image element out of the lowest end image elements of the second registered ridge the value of the A register is subtracted, and the value obtained in the subtraction is set at ya, and the value obtained by adding the value of the A register is set at yb. Namely, the second window W2 is lowered to the position where Ymax (j) becomes the center of the window, and then a window that is given a binary value is set up.

In Step 1310, the value of x is set at the x-coordinate of the middle line of the window that was given binary value and the value of y1 is set to Ymax (j).

In Steps 1311 and 1312, the tone data of the central image element of the window that is given binary value and tone data of the image elements to the right and left of the central image elements are averaged, and the average is set to the A register as the threshold value of the binary values.

In Step 1313, count registers U1 and U2 are reset (0).

In Steps 1314–1325, the image elements in the window that are given binary values are luster-scanned, and at the same time the tone data of each image element and the value of the A register are compared. In this comparison, in the image element which is on top of the central image element the number of image elements (black image element) that have tone data lower than the value of the A register is counted by the count register U1, and in the image elements that are below the central image element, the number of image elements (white image element) which have higher tone data than the value of the A register is counted by the counter register U2.

In other words, in Step 1316, the tone data of an image element at the coordinates (x,y) is read to the B register, and if the value of y is lower than $y_1$ (image element above the central image element), the value of the A register and the value of the B register are compared in Step 1318, and if B<A, the count register U1 is counted up by one count in Step 1319, and if the value of y is over $y_1$ (image element lower than the central image element), the value of the A register and the value of the B register are compared in Step 1320, and if B≧A, the count register U2 is counted up by one count in Step 1321.

In this way, the number of black image elements on top of the central image element (value of U1), and the number of white image elements under the central image element (value of U2) are counted when image elements are given binary values with the tone of the central image elements as the threshold value (average value including two image elements on the left and right).

In Steps 1316 and 1317, a half of the number of all image elements in the window that is given a binary value is set to the register A.

In Steps 1328 and 1329, it is judged whether the detection is correct or not. In other words, the above mentioned detection is judged proper and the process is finished when there are over 20% of black image elements in the area on the upper side of the central image element of the window that is given a binary value in the above mentioned binary value given (value of U1 over 20% of value of A register) and in the area under the central image element in the window that is given binary value white image elements are over 85% (value of U2 is over 85% of value of A register), and in other cases a mistake in sampling is judged, and the process returns from Step 1329 to Step 713 of the search process (FIG. 3t) which was explained above and the search window is renewed and set up.

When the above mentioned process is finished, the value of $y_1$ indicates the y-coordinate of the boundary of the vehicle in front and the road surface.

Figure 18:
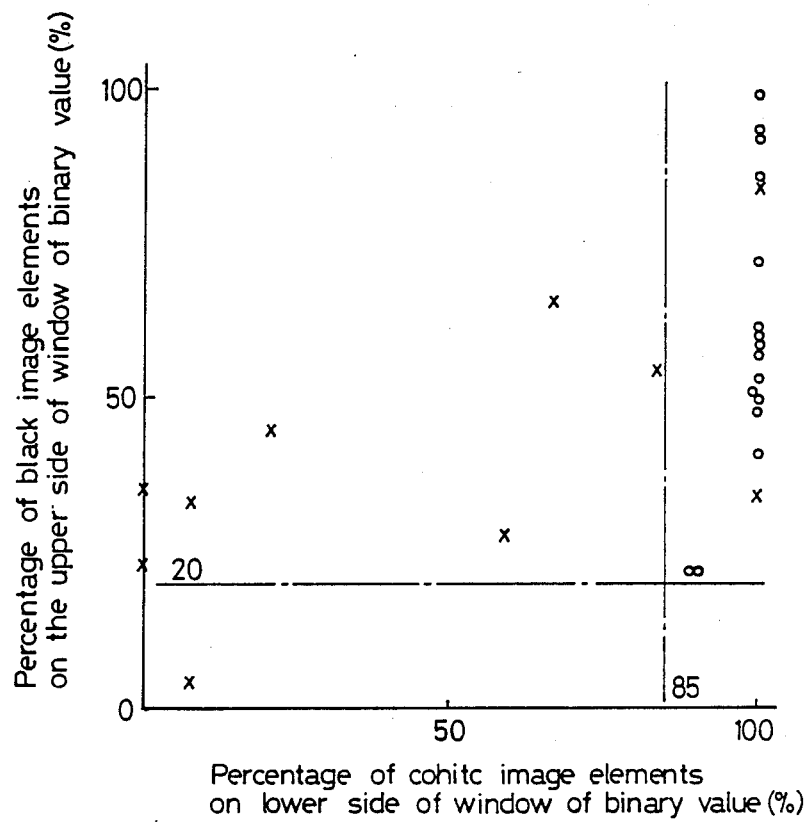

Regarding this boundary, refer to FIG. 18. FIG. 18 photographed a number of scenes which include a vehicle in front, and the correlation of the rate of white image elements in the lower side area and the rate of black image elements in the upper side area when a window of binary value is set up with the boundary as a center is marked by 0 mark, and the correlation of the rate of white image elements in the lower side area and the rate of black image elements in the upper side area when a window of binary values is set up with other places than the boundary between the vehicle and road surface as centers is marked by an x mark in FIG. 18. It can be seen that in the former the percentage of the white image elements in the lower side area of the window of binary value is over 85%, and the percentage of the black image elements in the upper side area is over 20%. When a contrary description is used, this graph shows that, when a window of binary value is set up with a second registration ridge as center and the percentage of the white image elements in the lower side area is over 85% and the percentage of the black image elements on the upper side area is over 20%, reliability to consider that ridge indicates the boundary of a vehicle in front and the road surface is high.

In Step 26 in the flow chart shown in FIG. 2 the value of $y^1$ is substituted into the above mentioned equation (6) to calculate the distance D to the vehicle in front. In this calculation the y-coordinate of the perspective pint given in Step 10 and the value given in Step 11 are substituted for α.

By using the device of this embodiment of the invention which was explained above, the distance to a vehicle in front was actually measured from a vehicle running on a highway, and distances were obtained in the measurement tolerance.

Figure 17C:
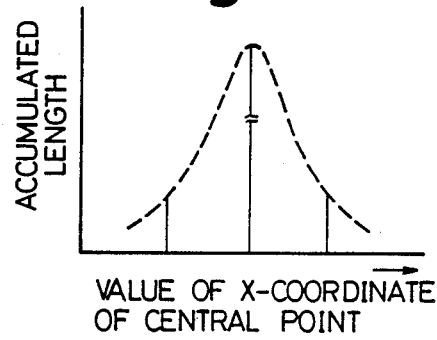
FIG. 17c is a graph which shows the correlation between the accumulative length of the ridges which have the same x-coordinate for the middle point of each ridge in FIG. 17b.

In general, vehicles are mostly symmetrical in the right and left direction, as shown in FIG. 16a. Accordingly, when a ridge is extracted by vertical differentiation of an image which corresponds to a vehicle, the center points (glac dots) of each ridge are lined up substantially on the x-axis as shown in FIG. 17b. In other words, when the correlation of the accumulation of ridge lengths which have the same x-coordinate and the x-coordinate of the middle point is sought, a remarkable peak appears on the x-axis is shown in FIG. 17c if there is a vehicle in front in the second window W2.

In the embodiment above described, it judges that if there are more than three ridges in the second window W2, there is a vehicle in front but it is possible to judge whether or not there is a vehicle in front by the correlation of the x-coordinate of the middle point of a ridge and accumulated lengths.

As stated above, according to the invention, a supervision area, first feature area and second feature area and processing area are successively set up and the information contained in them is compacted neatly, so that it is possible to detect an obstacle such as vehicle, etc. with simple conditioning. Furthermore, it is possible to accurately detect the distance of an obstacle such as vehicle, etc. from the spatial information obtained from image formation.

What is claimed is:

1. A distance detection means mounted on a vehicle for detecting an obstacle and for detecting a distance to the obstacle, the distance detection means comprising:
   original information generating means for generating original image information corresponding to at least part of a scene in a set detection direction;
   supervision area setting means for setting a supervision area which specifies at least part of said original image information;
   first feature extraction area setting means which successively renews, and which sets a search area at least part of which is included in said supervision area, the search area corresponding to an area having image information of the obstacle, said first feature extraction area setting means setting a first feature extraction area based on said search area when a correlation of optical feature components of said original image information in said search area and an occupation area satisfies set conditions, said optical feature components of said original image information corresponding to the obstacle;
   first edge extraction means for extracting edges in an area in which the optical feature components of the original image information in said first feature extraction area present a sudden change relative to surrounding optical feature components in a first direction;

second feature extraction area setting means for setting a second feature extraction area based on edges extracted by said first edge extracting means, said second feature extraction area corresponding to a width of the obstacle;

second edge extraction means for extracting edges in an area in which the optical feature components of the original image information in said second feature extraction area present a sudden change relative to surrounding optical feature components in a second direction which is different from said first direction; and distance detection means for detecting the obstacle when an edge extracted by said second edge extraction means exhibit specified features, and for detecting the distance to said obstacle based on the spatial information of said extracted edge.

2. A distance detection means mounted on a vehicle as claimed in claim 1, wherein said supervision area setting means sets as a supervision area, an original image information which is divided by a division line either continuous or interrupted for dividing a vehicle running zone written on the road surface.

3. A distance detection means mounted on a vehicle as claimed in claim 1, wherein said first feature extraction area setting means sets said detection area which corresponds to scenes away in succession from said detection means.

4. A distance detection means mounted on a vehicle as claimed in claim 3, wherein said first feature extraction area setting means specifies a standard based on optical feature components occupying a large area in said original image information in said search area and, when at least one of the peaks of said correlation which correspond to said search area appears on a side where optical feature components are low by said standard for a search area farther away from said search area, sets a first feature extraction area based on a latter search area.

5. A distance detection means mounted on a vehicle as claimed in claim 1, wherein the obstacle is another vehicle.

* * * * *